(12) United States Patent  
Imamichi

(10) Patent No.: US 7,873,653 B2
(45) Date of Patent: Jan. 18, 2011

(54) INFORMATION PROCESSING APPARATUS, INFORMATION ACQUIRING METHOD, AND COMPUTER PROGRAM PRODUCT

(75) Inventor: Takahiro Imamichi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 415 days.

(21) Appl. No.: 11/889,271

(22) Filed: Aug. 10, 2007

(65) Prior Publication Data

US 2008/0040311 A1 Feb. 14, 2008

(30) Foreign Application Priority Data

Aug. 11, 2006 (JP) ............... 2006-220519
Jun. 22, 2007 (JP) ............... 2007-165081

(51) Int. Cl.
*G06F 7/00* (2006.01)
*G06F 17/30* (2006.01)

(52) U.S. Cl. .............. 707/769; 707/783; 709/229; 711/163; 713/182; 726/27

(58) Field of Classification Search ............... 707/2, 707/3, 9, 10, 999.002, 999.003, 999.009, 707/999.1, 769, 783; 709/229; 711/145, 711/163, 164; 713/182, 183, 184; 726/27, 726/28, 29, 30
See application file for complete search history.

(56) References Cited

U.S. PATENT DOCUMENTS

| | | | | |
|---|---|---|---|---|
| 5,737,549 A | * | 4/1998 | Hersch et al. ............... 709/203 |
| 6,038,563 A | * | 3/2000 | Bapat et al. .................. 707/10 |
| 6,085,191 A | * | 7/2000 | Fisher et al. ................. 707/737 |
| 6,202,066 B1 | * | 3/2001 | Barkley et al. ................. 707/9 |
| 6,236,996 B1 | * | 5/2001 | Bapat et al. ........... 707/999.009 |
| 6,275,825 B1 | * | 8/2001 | Kobayashi et al. .......... 707/737 |
| 6,581,060 B1 | * | 6/2003 | Choy ........................ 707/694 |
| RE38,410 E | * | 1/2004 | Hersch et al. ............... 709/203 |
| 7,216,126 B2 | * | 5/2007 | Choy ........................... 707/9 |
| 7,461,135 B2 | * | 12/2008 | Murayama et al. .......... 709/217 |
| 7,526,480 B2 | * | 4/2009 | Nadeau et al. ................. 707/9 |
| 7,769,859 B1 | * | 8/2010 | Gaonkar et al. ............. 709/225 |
| 2002/0065815 A1 | * | 5/2002 | Layden ........................ 707/3 |
| 2003/0191768 A1 | * | 10/2003 | Choy ........................ 707/100 |
| 2004/0044655 A1 | * | 3/2004 | Cotner et al. .................. 707/3 |
| 2005/0060433 A1 | * | 3/2005 | Choi ........................ 709/247 |
| 2005/0097595 A1 | * | 5/2005 | Lipsanen et al. .............. 725/25 |
| 2005/0165834 A1 | * | 7/2005 | Nadeau et al. .......... 707/103 R |
| 2005/0187937 A1 | * | 8/2005 | Kawabe et al. ................. 707/9 |
| 2006/0101399 A1 | * | 5/2006 | Murayama et al. .......... 717/120 |
| 2006/0161696 A1 | * | 7/2006 | Anjo et al. .................... 710/22 |
| 2007/0188824 A1 | | 8/2007 | Imamichi |
| 2009/0077250 A1 | * | 3/2009 | Murayama et al. .......... 709/229 |

FOREIGN PATENT DOCUMENTS

JP 2005-259111 9/2005

* cited by examiner

*Primary Examiner*—John E Breene
*Assistant Examiner*—Phong Nguyen
(74) *Attorney, Agent, or Firm*—Dickstein Shapiro LLP

(57) ABSTRACT

A request receiving unit receives requested information input by a user. A corresponding-program acquiring unit acquires processing-program identification information corresponding to the requested information from a corresponding-program storing unit. A processing-program reading unit reads a processing program corresponding to the processing-program identification information from a processing-program storing unit. The request receiving unit acquires information corresponding to the requested information from the information storing unit by executing the processing program read by the processing-program reading unit.

13 Claims, 27 Drawing Sheets

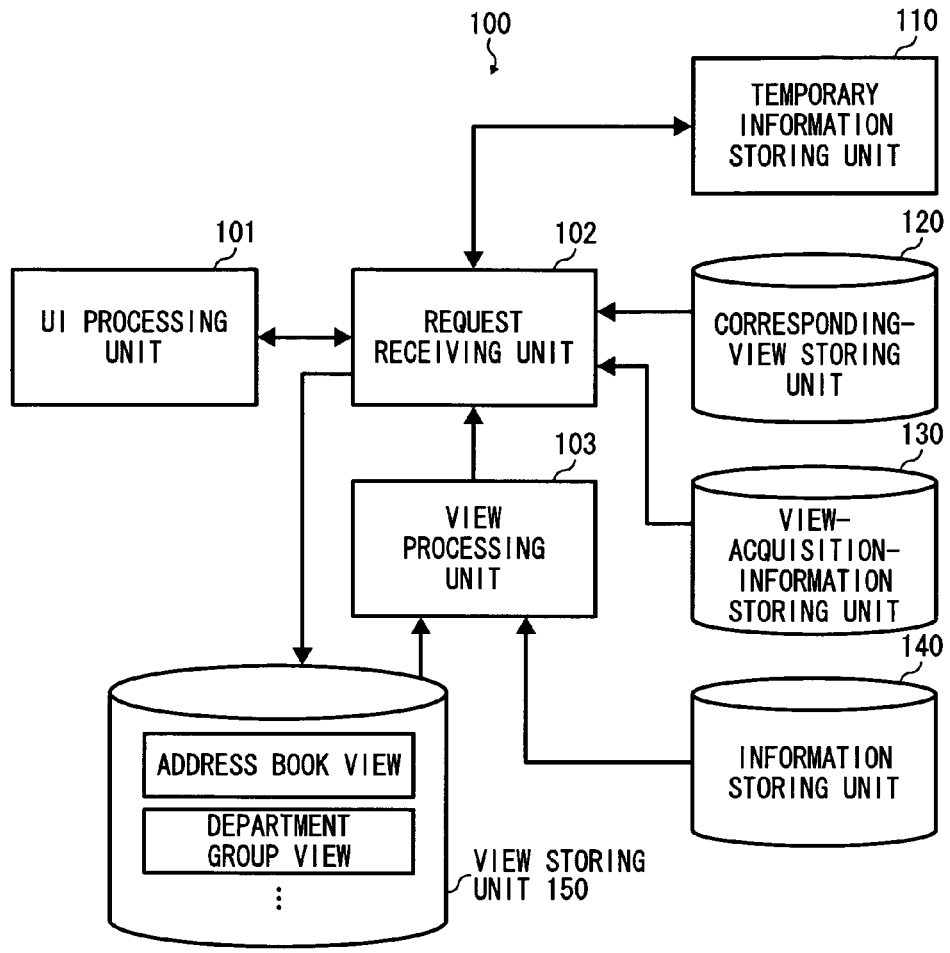

| VIEW NAME | ATTRIBUTE 1 | ATTRIBUTE 2 | ... |
|---|---|---|---|
| ADDRESS BOOK VIEW<br>ACCOUNT INFORMATION VIEW<br>ADDRESS LIST VIEW<br>DEPARTMENT GROUP VIEW<br>⋮ | NAME<br>ACCOUNT<br>ADDRESS<br>ALL ATTRIBUTES OF PERSON A<br>⋮ | EMAIL ADDRESS<br>PASSWORD<br>TELEPHONE NUMBER<br>ALL ATTRIBUTES OF PERSON B<br>⋮ | ⋮ |

FIG. 11

| VIEW NAME | ACCESS AUTHORITY INFORMATION |
|---|---|
| ADDRESS BOOK VIEW | GENERAL USER |
| DEPARTMENT MEMBER VIEW | DEPARTMENT MEMBER |
| ⋮ | ⋮ |

FIG. 12

| USER TYPE | LEVEL OF ACCESS AUTHORITY |
|---|---|
| GUEST USER | WEAK (ACCESS LEVEL:1) |
| GENERAL USER | NORMAL (ACCESS LEVEL:3) |
| DEPARTMENT MEMBER | SLIGHTLY STRONG (ACCESS LEVEL:4) |
| ADMINISTRATOR | STRONG (ACCESS LEVEL:5) |
| ⋮ | ⋮ |

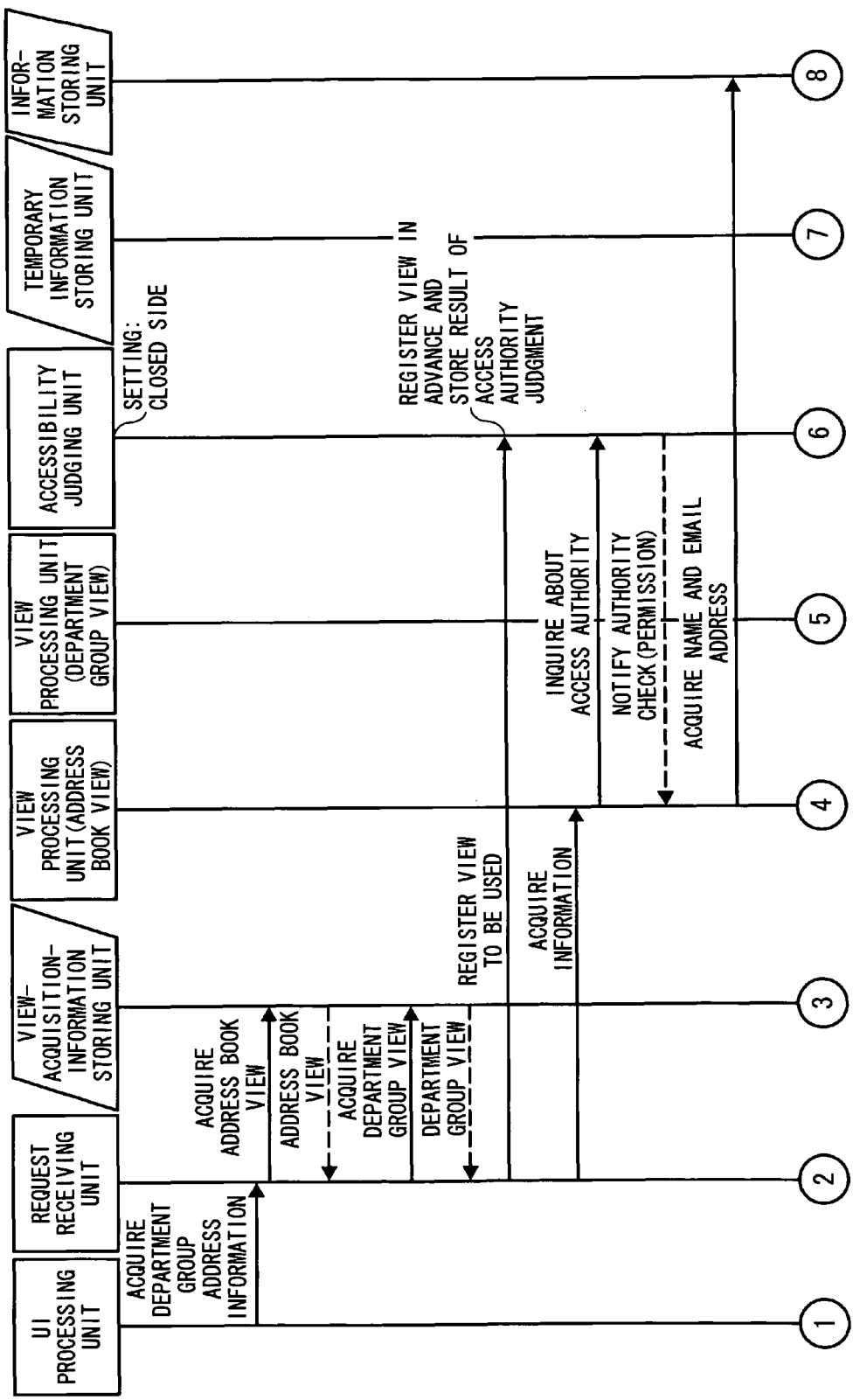

FIG. 24

| ATTRIBUTE NAME | OPERATION | ACCESS AUTHORITY INFORMATION |
|---|---|---|
| NAME | GET | GENERAL USER, ADMINISTRATOR |
| NAME | SET | GENERAL USER, ADMINISTRATOR |
| PASSWORD | GET | ADMINISTRATOR |
| PASSWORD | SET | ADMINISTRATOR |
| ⋮ | ⋮ | ⋮ |

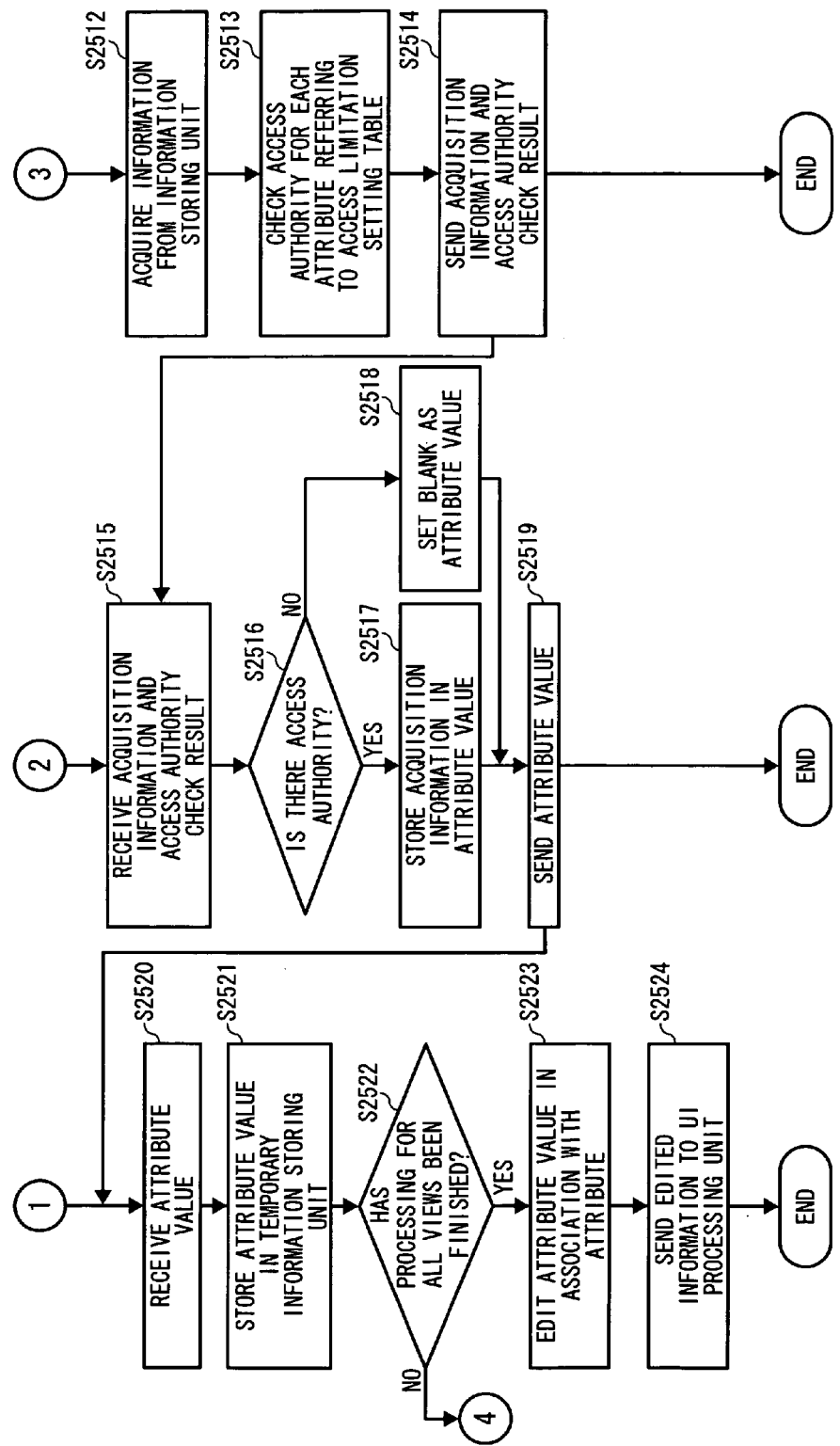

FIG. 26

| IDENTIFICATION INFORMATION OF VIEW(DATA) | OPERATION | ATTRIBUTE NAME | ACCESS AUTHORITY INFORMATION |
|---|---|---|---|
| ID=1 | GET | NAME | GENERAL USER, ADMINISTRATOR |
| ID=1 | GET | PASSWORD | ADMINISTRATOR |
| ID=2 | GET | NAME | GENERAL USER, ADMINISTRATOR |
| ⋮ | ⋮ | ⋮ | ⋮ |

INFORMATION PROCESSING APPARATUS, INFORMATION ACQUIRING METHOD, AND COMPUTER PROGRAM PRODUCT

CROSS-REFERENCE TO RELATED APPLICATIONS

The present application claims priority to and incorporates by reference the entire contents of Japanese priority documents, 2006-220519 filed in Japan on Aug. 11, 2006, and 2007-165081 filed in Japan on Jun. 22, 2007.

BACKGROUND OF THE INVENTION

1. Field of the Invention

The present invention relates to an information processing apparatus, an information acquiring method, and a computer program product, and more particularly, to acquisition of information stored in an apparatus or a system without redundancy.

2. Description of the Related Art

When a client uses a service of a server connected on a network, the client is generally requested to present a user name, a password, and the like to the server to prevent an illegal access to the server. In such a case, when a plurality of user management servers (e.g., document management servers) are set, every time the user uses each of the user management servers, the user needs to input the user name, the password, and the like to the server. Therefore, the operation is complicated for the user.

As an apparatus for solving such a problem, a user information handling apparatus that manages information on a user is disclosed in Japanese Patent Application Laid-Open No. 2005-259111. In such an apparatus, when information requested by the user is not present in a server that receives the request, the apparatus passes a user name, a password, and the like to another server and can perform user authentication without requesting the user to input the user name, the password, and the like again.

However, in the technology disclosed in Japanese Patent Application Laid-Open No. 2005-259111, the apparatus needs to perform the user authentication to acquire information stored by the respective servers. Therefore, it is necessary to store the user name, the password, and the like for each of the servers. For example, when the user changes the password, the user needs to change the password for the respective servers. As a result, it is impossible to prevent the complicated work.

Plural pieces of identical information may be stored by purpose in, for example, a server apparatus, a terminal apparatus, or a system including the server apparatus and the terminal apparatus. When a certain piece of information is changed, it is necessary to apply processing for changing information to all areas in which the piece of information is stored. Therefore, enormous amount of work is necessary to keep consistency of the information.

SUMMARY OF THE INVENTION

It is an object of the present invention to at least partially solve the problems in the conventional technology.

An apparatus for processing information, according to one aspect of the present invention, includes an information storing unit that stores therein a plurality of pieces of information without redundancy in either one of the information processing apparatus and a system including the information processing apparatus; a corresponding-program storing unit that stores therein requested information indicating an attributes of a part of or all of pieces of information included in the information stored in the information storing unit and processing-program identification information for identifying a processing program for acquiring the information corresponding to the requested information from the information storing unit, in association with each other; a processing-program storing unit that stores therein the processing program corresponding to the processing-program identification information; a request receiving unit that receives the requested information input by a user; a corresponding-program acquiring unit that acquires the processing-program identification information corresponding to the requested information received by the request receiving unit from the corresponding-program storing unit; and a processing-program reading unit that reads the processing program corresponding to the processing-program identification information acquired by the corresponding-program acquiring unit from the processing-program storing unit. The request receiving unit acquires information corresponding to the requested information from the information storing unit by executing the processing program read by the processing-program reading unit.

A method of acquiring information, according to another aspect of the present invention is for an image processing apparatus that includes an information storing unit that stores therein a plurality of pieces of information without redundancy in either one of the information processing apparatus and a system including the information processing apparatus, a corresponding-program storing unit that stores therein requested information indicating an attributes of a part of or all of pieces of information included in the information stored in the information storing unit and processing-program identification information for identifying a processing program for acquiring the information corresponding to the requested information from the information storing unit, in association with each other, and a processing-program storing unit that stores therein the processing program corresponding to the processing-program identification information. The method includes request receiving includes receiving the requested information input by a user; corresponding-program acquiring includes acquiring the processing-program identification information corresponding to the requested information received at the request receiving from the corresponding-program storing unit; and processing-program reading includes reading the processing program corresponding to the processing-program identification information acquired at the corresponding-program acquiring from the processing-program storing unit. The request receiving includes acquiring information corresponding to the requested information from the information storing unit by executing the processing program read at the processing-program reading.

A computer program product according to still another aspect of the present invention includes a computer-usable medium having computer-readable program codes embodied in the medium for acquiring information in an image processing apparatus that includes an information storing unit that stores therein a plurality of pieces of information without redundancy in either one of the information processing apparatus and a system including the information processing apparatus, a corresponding-program storing unit that stores therein requested information indicating an attribute of a part of or all of pieces of information included in the information stored in the information storing unit and processing-program identification information for identifying a processing program for acquiring the information corresponding to the requested information from the information storing unit, in association with each other, and a processing-program storing unit that stores therein the processing program corresponding to the processing-program identification information. The computer-readable program codes when executed cause a computer to execute request receiving includes receiving the requested information input by a user; corresponding-program acquiring includes acquiring the processing-program identification information corresponding to the requested information received at the request receiving from the corresponding-program storing unit; and processing-program reading includes reading the processing program corresponding to the processing-program identification information acquired at the corresponding-program acquiring from the processing-program storing unit. The request receiving includes acquiring information corresponding to the requested information from the information storing unit by executing the processing program read at the processing-program reading.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 1 is a block diagram of a structure of an information processing apparatus according to a first embodiment of the present invention;

FIG. 2 is a diagram for explaining an example of a data structure of a corresponding-view storing unit;

FIG. 11 is a diagram for explaining an example of a data structure of an access-authority-information storing unit;

FIG. 12 is a diagram for explaining an example of a data structure of an authority storing unit;

FIGS. 17A and 17B are diagrams for explaining a flow of processing for acquiring department group address information;

FIG. 24 is a diagram for explaining an example of a data structure of an attribute-access-authority-information storing unit;

FIGS. 25A and 25B are flowcharts of an information acquisition processing procedure performed by a request receiving unit, a view processing unit, and an attribute-accessibility judging unit;

FIG. 26 is a diagram for explaining an example of an access limit setting table;

DETAILED DESCRIPTION OF THE PREFERRED EMBODIMENTS

Figures 3, 4:
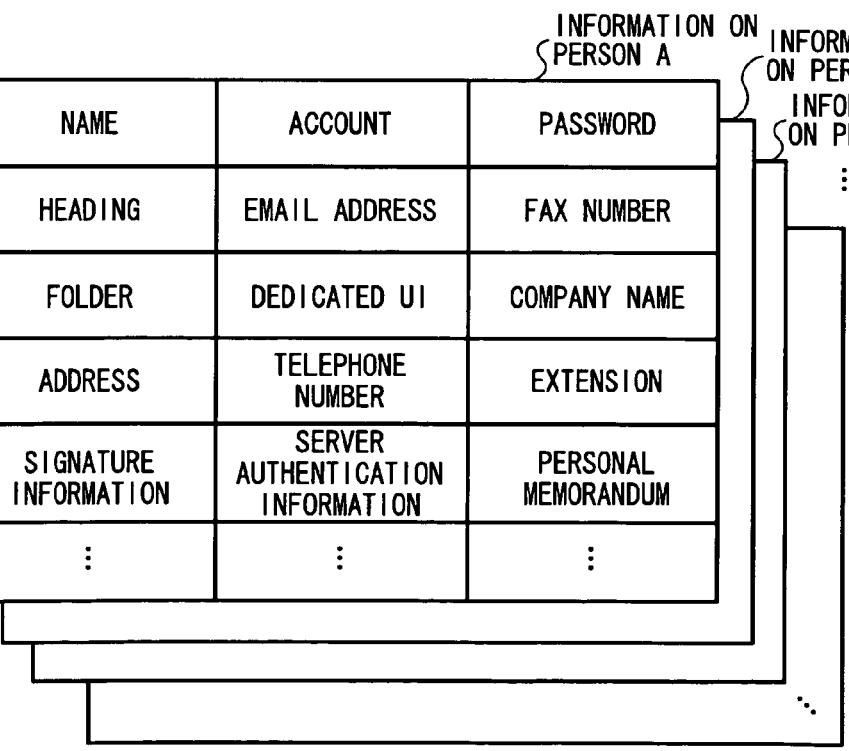
FIG. 3 is a diagram for explaining an example of a data structure of a view-acquisition-information storing unit.
FIG. 4 is a diagram for explaining an example of a data structure of an information storing unit.

Exemplary embodiments of the present invention are explained in detail below with reference to the accompanying drawings. The present invention is not limited to the embodiments.

An example of a structure of an information processing apparatus according to a first embodiment of the present invention is explained referring to the accompanying drawings. FIG. 1 is a block diagram of the structure of the information processing apparatus according to the first embodiment.

An information processing apparatus 100 according to this embodiment includes a user interface (UI) processing unit 101, a request receiving unit 102, a view processing unit 103, a temporary information storing unit 110, a corresponding-view storing unit 120, a view-acquisition-information storing unit 130, an information storing unit 140, and a view storing unit 150.

The UI processing unit 101 inputs information requested by a user (requested information) and outputs information corresponding to the requested information. The UI processing unit 101 is, specifically, a key board, a display, and the like. In the case of a system connected to other information processing apparatuses via a network, the system may include an input and output control unit instead of the UI processing unit 101, transmit acquired information to the other information processing apparatuses, and output information acquired by the other information processing apparatuses.

The requested information indicates a part or all of attributes of information included in a plurality of pieces of information stored in the information storing unit 140. For example, requested information "address information" indicates a collection of an attribute "name" and an attribute "E-mail address". Information corresponding to the requested information "address information" is information, for example, "A", corresponding to the attribute "name" stored in the information storing unit 140 and information, for example, "ADXXXX@XXX.ne.jp", corresponding to the attribute information "E-mail address".

The request receiving unit 102 receives the requested information inputted from the UI processing unit 101 and acquires a view name corresponding to the requested information from the corresponding-view storing unit 120. The request receiving unit 102 reads a view corresponding to the view name, which is acquired from the corresponding-view storing unit 120, from the view storing unit 150 into the view processing unit 103 and acquires the information stored by the information storing unit 140 using the view processing unit 103. The view is a program for acquiring a collection of information set in advance out of the information stored by the information storing unit 140. The view forms a processing program according to an aspect of the present invention. The request receiving unit 102 constitutes a request receiving unit, a corresponding-program acquiring unit, and a reading unit according to aspects of the present invention.

The view processing unit 103 executes the view read from the view storing unit 150 according to the request of the request receiving unit 102 to thereby acquire information from the information storing unit 140 or the temporary information storing unit 110. The request receiving unit 102 can acquire desired information from the information stored by the information storing unit 140 by reading a view corresponding to the desired information in the view processing unit 103 and causing the view processing unit 103 to execute the view.

The corresponding-view storing unit 120 stores a view name for identifying a view for acquiring information corresponding to requested information. FIG. 2 is a diagram for explaining an example of a data structure of the corresponding-view storing unit. The corresponding-view storing unit 120 stores requested information inputted by the UI processing unit 101 and a view name for identifying a view for acquiring information corresponding to the requested information in association with each other. For example, when acquisition of "address information" is requested by the UI processing unit 101, it is possible to acquire information corresponding to the requested information "address information" by requesting a view having the name "address book view", i.e., identification information, to acquire information.

The view-acquisition-information storing unit 130 stores attributes of information acquired by respective views from the information storing unit 140. FIG. 3 is a diagram for explaining an example of a data structure of the view-acquisition-information storing unit 130. The view-acquisition-information storing unit 130 stores a view name and attributes of one or a plurality of pieces of information in association with each other. For example, "address book view" indicates that information corresponding to attributes "name" and "E-mail address" is acquired from the information storing unit 140.

The information storing unit 140 stores information handled in the information processing apparatus 100 or a system connected to the information processing apparatus 100 via a local area network (LAN) or the like. FIG. 4 is a diagram for explaining an example of a data structure of the information storing unit 140. The information storing unit 140 stores one piece of information without redundancy. In the information storing unit 140 shown in FIG. 4, attributes of information are shown. However, actually, information such as a name, an account, and a password for each user is stored. For example, in the case of information concerning Person A, "A" is stored as the name, "SXXX041" is stored as the account, and "PXXX365" is stored as the password.

The view storing unit 150 stores a plurality of views corresponding to requested information. The view storing unit 150 stores views such as an address book view and a department group view. The views are read in the view processing unit 103 and executed according to a request of the request receiving unit 102.

When information acquired from the information storing unit 140 by the views is further narrowed down to acquire information, the temporary information storing unit 110 temporarily stores the information acquired from the information storing unit 140.

Figure 5:
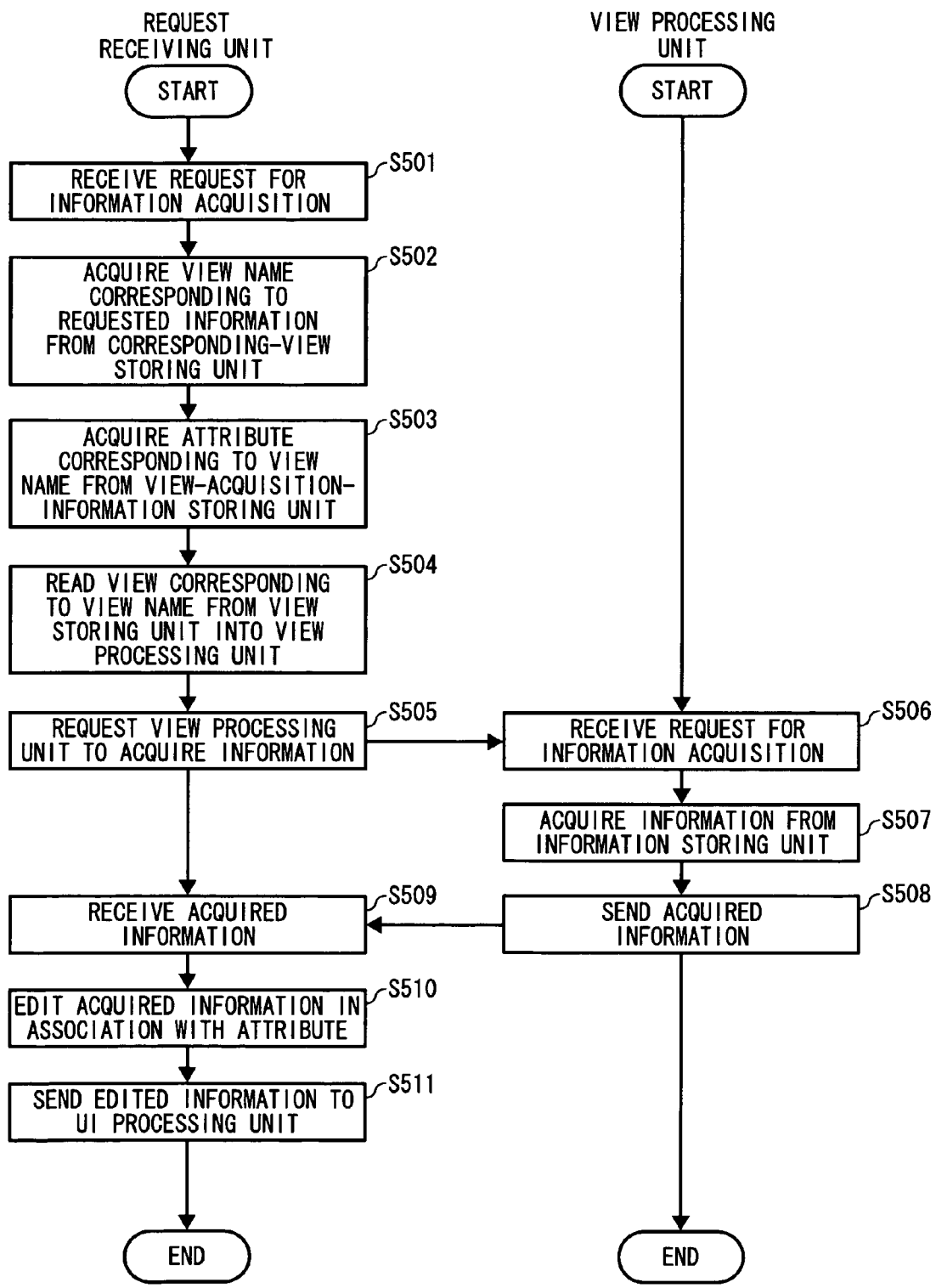
FIG. 5 is a flowchart of an information acquisition processing procedure performed by a request receiving unit and a view processing unit.

FIG. 5 is a flowchart of an information acquisition processing procedure performed by the request receiving unit and the view processing unit.

The request receiving unit 102 receives a request for information acquisition inputted by the UI processing unit 101 (step S501). The request receiving unit 102 acquires a view name corresponding to the requested information from the corresponding-view storing unit 120 (step S502). The request receiving unit 102 acquires an attribute corresponding to the acquired view name from the view-acquisition-information storing unit 130 (step S503). The request receiving unit 102 reads a view corresponding to the view name from the view storing unit 150 into the view processing unit 103 (step S504). The request receiving unit 102 requests the view processing unit 103 to acquire information (step S505).

The view processing unit 103 receives the request for information acquisition from the request receiving unit 102 (step S506). The view processing unit 103 acquires information from the information storing unit 140 (step S507). In this way, the view processing unit 103 acquires the information corresponding to the attribute registered in the view by the view itself corresponding to the view name. For example, in the case of the address book view, information corresponding to names and Email addresses of all users stored in the information storing unit 140 is acquired. The view processing unit 103 sends the acquired information to the request receiving unit 102 (step S508).

The request receiving unit 102 receives the acquired information (step S509). The request receiving unit 102 edits the acquired information in association with the attribute acquired from the view-acquisition-information storing unit 130 (step S510). The request receiving unit 102 sends the edited information to the UI processing unit 101 (step S511). The UI processing unit 101 outputs the edited information to a display screen and the like. Alternatively, the UI processing unit 101 transmits the edited information to other information processing apparatuses connected to the information processing apparatus 100 via a network.

As described above, identical information is stored in the apparatus or in a system in which a plurality of apparatuses are connected via a network by the information storing unit 140 without redundancy. A view corresponding to each piece of desired information is included in the apparatus. It is possible to acquire the desired information by requesting the view processing unit 103, which reads the view, to acquire the information. Therefore, it is possible to unitarily manage information, it is unnecessary to manage a plurality of pieces of identical information by purpose, it is easy to perform information management, and it is possible to reduce complicated work for keeping consistency of information.

Even when information is added to the information stored by the information storing unit 140 or an attribute of the information stored by the information storing unit 140 is changed, it is possible to keep consistency by changing the information storing unit 140 and the view (the processing program) stored by the view storing unit 150. Therefore, it is possible to reduce work load for the change.

Figure 6:
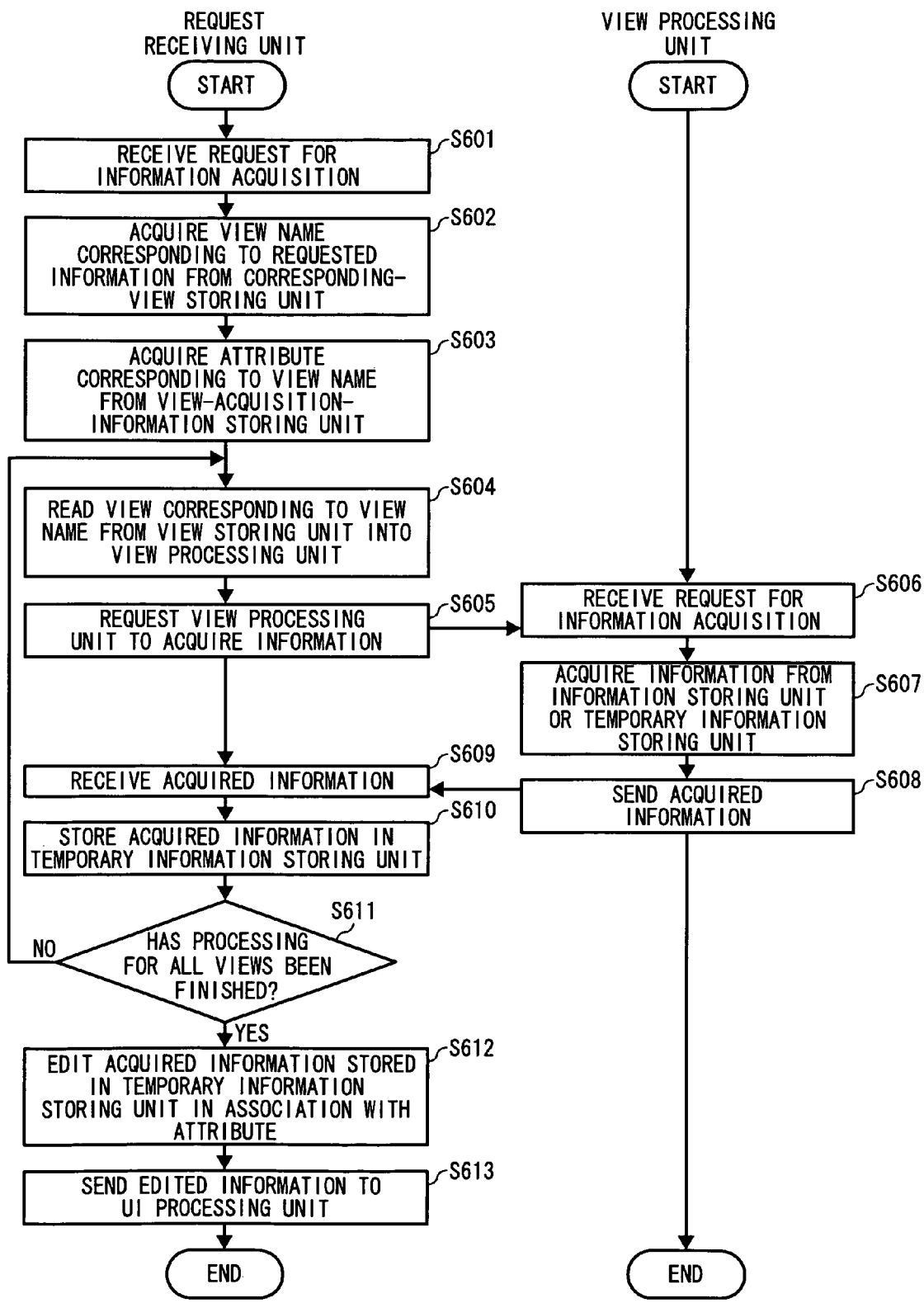
FIG. 6 is a flowchart of an information acquisition processing performed by the request receiving unit and the view processing unit.

FIG. 6 is a flowchart of an information acquisition processing performed by the request receiving unit and the view processing unit.

The request receiving unit 102 receives a request for information acquisition inputted by the UI processing unit 101 (step S601). The request receiving unit 102 acquires a view name corresponding to the requested information from the corresponding-view storing unit 120 (step S602). For example, when the requested information is "department group address book", view names "address book view" and "department group view" are acquired. Information is acquired by the two views. The request receiving unit 102 further acquires attributes corresponding to the acquired view names from the view-acquisition-information storing unit 130 (step S603). The request receiving unit 102 reads views corresponding to the view names from the view storing unit 150 into the view processing unit 103 (step S604). The request receiving unit 102 requests the view processing unit 103 to acquire information (step S605).

The view processing unit 103 receives the request for information acquisition from the request receiving unit 102 (step S606). The view processing unit 103 acquires information from the information storing unit 140 or the temporary information storing unit 110 (step S607). For the first time, the view processing unit 103 acquires information from the information storing unit 140. For the second and subsequent times, the view processing unit 103 acquires the information acquired last time, stored in the temporary information storing unit 110, and requested this time. The view processing unit 103 sends the acquired information to the request receiving unit 102 (step S608).

The request receiving unit 102 receives the acquired information (step S609). The request receiving unit 102 stores the acquired information in the temporary information storing unit 110 (step S610). The request receiving unit 102 judges whether the processing for all the views has been finished (step S611). When it is judged that the processing for all the views has not been finished ("No" at step S611), the request receiving unit 102 returns to step S604 and executes the processing for the remaining views.

When it is judged that the processing for all the views has been finished ("Yes" at step S611), the request receiving unit 102 edits the acquired information in association with the attributes acquired from the view-acquisition-information storing unit 130 (step S612). The request receiving unit 102 sends the edited information to the UI processing unit 101 (step S613). The UI processing unit 101 outputs the edited information to the display screen and the like. Alternatively, the UI processing unit 101 transmits the edited information to the other information processing apparatuses connected to the information processing apparatus 100 via the network.

The information acquisition processing is executed using the views in this way. This makes it possible to acquire information of various patterns from the information stored in the information storing unit 140 simply by preparing a basic view. Therefore, it is possible to reduce the number of views that should be prepared and reduce work load for preparation and management of the views.

Figure 7:
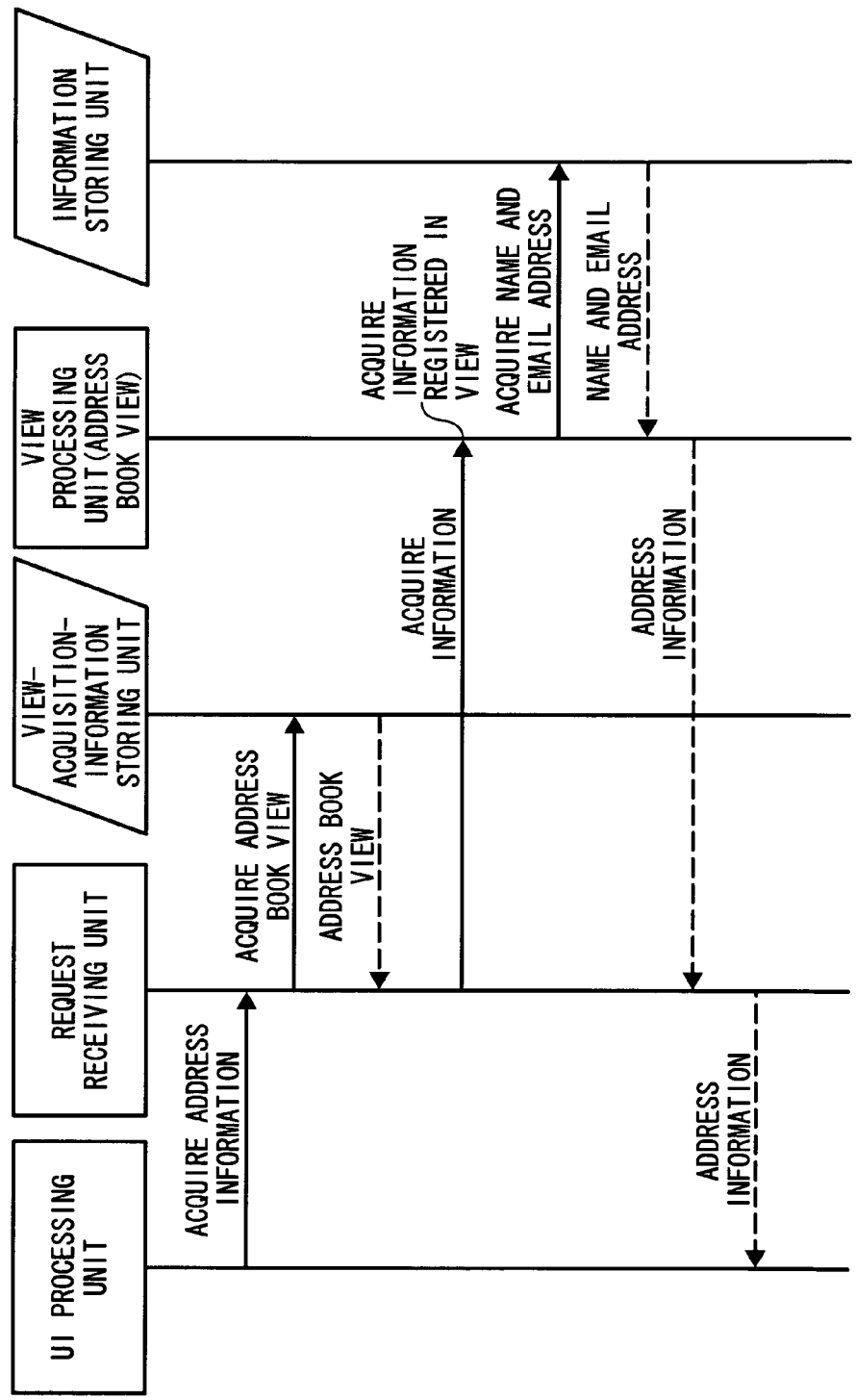
FIG. 7 is a diagram for explaining a flow of processing for acquiring address information.

FIG. 7 is a diagram for explaining a flow of processing for acquiring address information according to the flow of the flowchart shown in FIG. 5. In the diagram, a flow of information is mainly explained.

The request receiving unit 102 receives a request for "address information" acquisition inputted by the UI processing unit 101 (step S501). The request receiving unit 102 acquires a view name "address book view" corresponding to the "address information" from the corresponding-view storing unit 120 (step S502). The request receiving unit 102 acquires attributes "name" and "Email address" corresponding to the acquired view name "address book view" from the view-acquisition-information storing unit 130 (step S503). The request receiving unit 102 reads a view "address book view" corresponding to the view name from the view storing unit 150 into the view processing unit 103 (step S504). The request receiving unit 102 requests the view processing unit 103, i.e., the "address book view" to acquire information (step S505).

The view processing unit (address book view) 103 receives the request for information acquisition from the request receiving unit 102 (step S506). The view processing unit (address book view) 103 acquires the requested information, i.e., information corresponding to names and Email addresses, from the information storing unit 140 (step S507). In the case of the address book view, information corresponding to names and Email addresses of all users stored in the information storing unit 140 is acquired. The view processing unit (address book view) 103 sends the acquired information to the request receiving unit 102 (step S508).

The request receiving unit 102 receives the acquired information (step S509). The request receiving unit 102 edits the acquired information in association with the attributes acquired from the view-acquisition-information storing unit 130 (step S510). The request receiving unit 102 sends the edited information to the UI processing unit 101 (step S511). The UI processing unit 101 outputs the edited information to the display screen and the like. Alternatively, the UI processing unit 101 transmits the edited information to other information processing apparatuses connected to the information processing apparatus 100 via a network.

Figure 8:
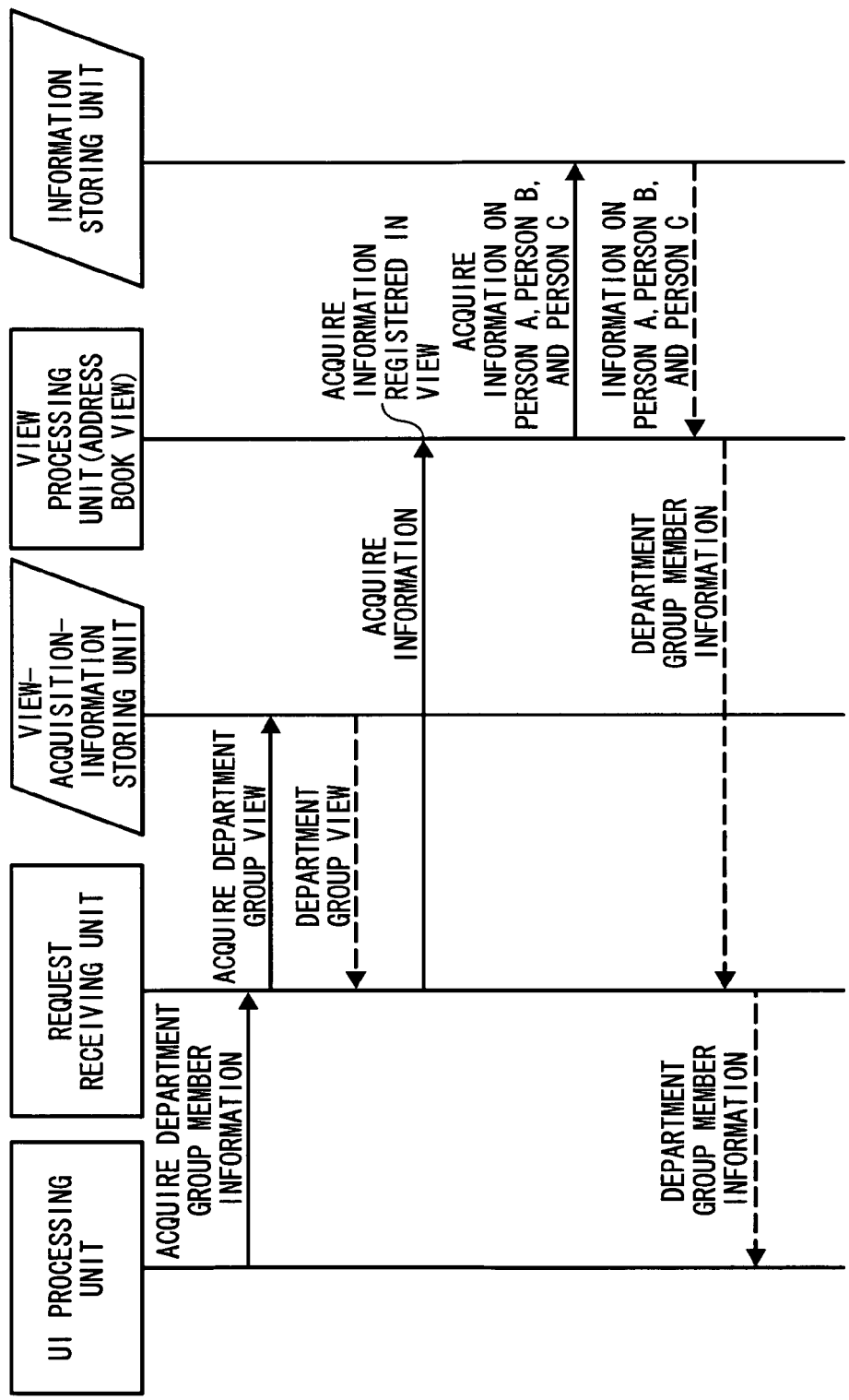
FIG. 8 is a diagram for explaining a flow of processing for acquiring department group member information.

FIG. 8 is a diagram for explaining a flow of processing for acquiring department group member information according to the flow of the flowchart shown in FIG. 5. In the diagram, a flow of information is mainly explained.

The request receiving unit 102 receives a request for "department group member information" acquisition inputted by the UI processing unit 101 (step S501). The request receiving unit 102 acquires a view name "department group view" corresponding to the "department group member information" from the corresponding-view storing unit 120 (step S502). The request receiving unit 102 acquires attributes "all attributes of Person A", "all attributes of Person B", and "all attributes of Person C" corresponding to the view name "department group view" from the view-acquisition-information storing unit 130 (step S503). The request receiving unit 102 reads a view "department group view" corresponding to the view name from the view storing unit 150 into the view processing unit 103 (step S504). The request receiving unit 102 requests the view processing unit 103, i.e., the "department group view" to acquire information (step S505).

The view processing unit (department group view) 103 receives the request for information acquisition from the request receiving unit 102 (step S506). The view processing unit (department group view) 103 acquires the requested information, i.e., all attributes of Person A, all attributes of Person B, and all attributes of Person C, from the information storing unit 140 (step S507). The view processing unit (department group view) 103 sends the acquired information to the request receiving unit 102 (step S508).

The request receiving unit 102 receives the acquired information (step S509). The request receiving unit 102 edits the acquired information in association with the attributes acquired from the view-acquisition-information storing unit 130 (step S510). The request receiving unit 102 sends the edited information to the UI processing unit 101 (step S511). The UI processing unit 101 outputs the edited information to the display screen and the like. Alternatively, the UI processing unit 101 transmits the edited information to other information processing apparatuses connected to the information processing apparatus 100 via a network.

Figure 9:
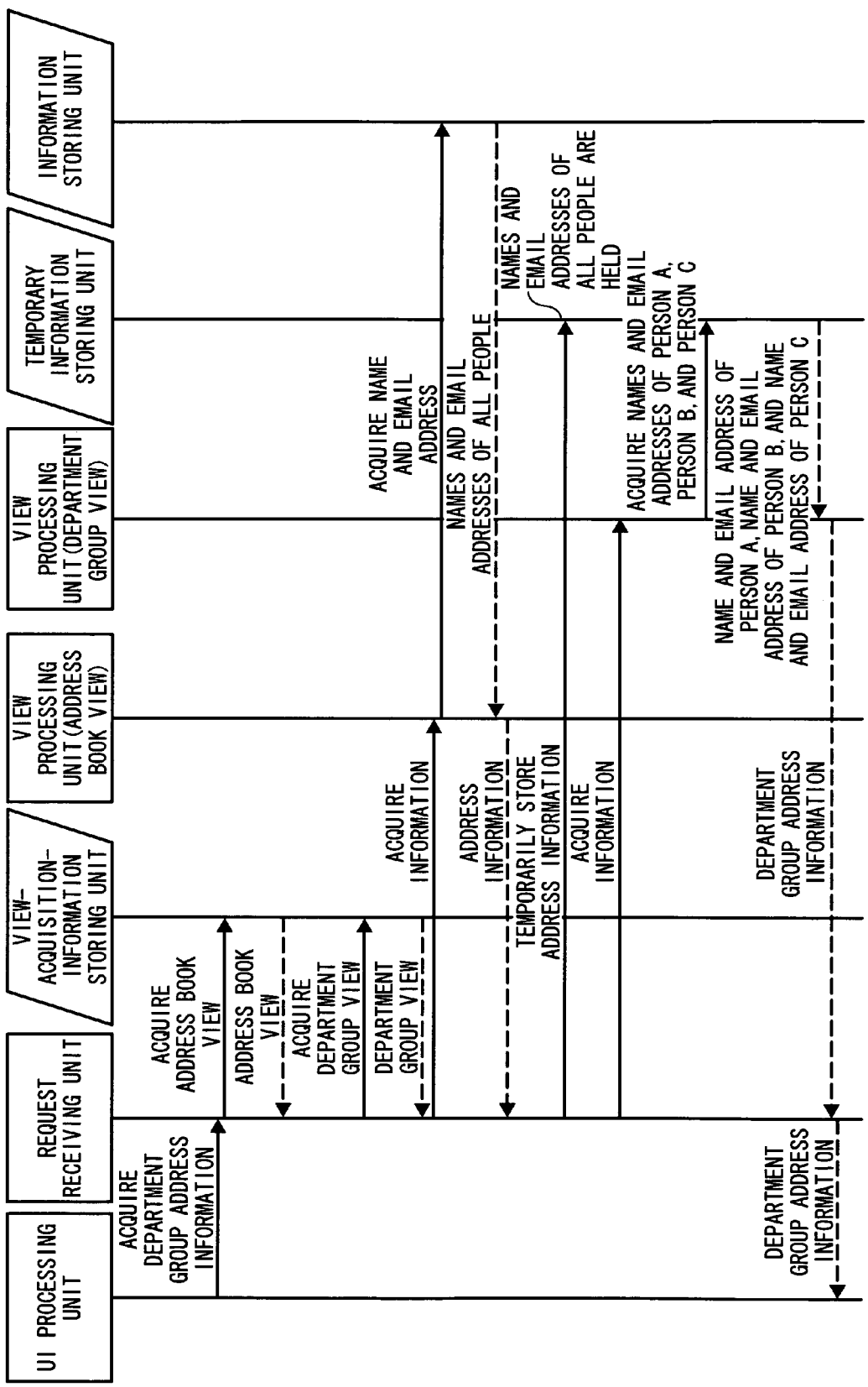
FIG. 9 is a diagram for explaining a flow of processing for acquiring address book information for a department group.

FIG. 9 is a diagram for explaining a flow of processing for acquiring address book information of a department group according to the flow of the flowchart shown in FIG. 6. In the diagram, a flow of information is mainly explained.

The request receiving unit 102 receives a request for information "department group address book information" acquisition inputted by the UI processing unit 101 (step S601). The request receiving unit 102 acquires view names "address book view" and "department group view" corresponding to "department group address book information" from the corresponding-view storing unit 120 (step S602). The request receiving unit 102 further acquires attributes corresponding to the acquired view names from the view-acquisition-information storing unit 130 (step S603). Specifically, the request receiving unit 102 acquires attributes "name" and "Email address" corresponding to the view name "address book view" and acquires attributes "all attributes of Person A", "all attributes of Person B", and "all attributes of Person C" corresponding to the view name "department group view". The request receiving unit 102 reads a view "address book view" corresponding to the view name "address book view" from the view storing unit 150 into the view processing unit 103 (step S604). The request receiving unit 102 requests the view processing unit 103, i.e., the "address book view", to acquire information (step S605).

The view processing unit (address book view) 103 receives the request for information acquisition from the request receiving unit 102 (step S606). The view processing unit (address book view) 103 acquires information from the information storing unit 140 (step S607). The view processing unit (address book view) 103 sends the acquired information, i.e., names and Email addresses of all members stored in the information storing unit 140, to the request receiving unit 102 (step S608).

The request receiving unit 102 receives the acquired information (step S609). The request receiving unit 102 stores the acquired information in the temporary information storing unit 110 (step S610). The request receiving unit 102 judges whether the processing for all the views has been finished (step S611). When it is judged that the processing for all the views has not been finished ("No" at step S611), the request receiving unit 102 returns to step S604 and executes the processing for the remaining views.

The request receiving unit 102 reads a view "department group view" corresponding to the view name "department group view" from the view storing unit 150 into the view processing unit 103 (step S604). The request receiving unit 102 requests the view processing unit 103, i.e., the "department group view", to acquire information (step S605). The view processing unit (department group view) 103 receives the request for information acquisition from the request receiving unit 102 (step S606). The view processing unit (department group view) 103 acquires information from the temporary information storing unit 110 (step S607). The information stored in the temporary information storing unit 110 is information corresponding to the names and the Email addresses of all the members stored in the information storing unit 140. Therefore, when attributes of department group members "all attributes of Person A, all attributes of Person B, and all attributes of Person C" are acquired by the department group view from the information stored in the temporary information storing unit 110, it is possible to acquire information corresponding to a name and an Email address of Person A, a name and an Email address of Person B, and a name and an Email address of Person C.

The view processing unit (department group view) 103 sends the acquired information, i.e., the name and the Email address of Person A, the name and the Email address of Person B, and the name and the Email address of Person C, to the request receiving unit 102 (step S608). The request receiving unit 102 receives the acquired information (step S609). The request receiving unit 102 stores the acquired information in the temporary information storing unit 110 (step S610).

When it is judged that the processing for all the views has been finished ("Yes" at step S611), the request receiving unit 102 edits the acquired information in association with the attributes acquired from the view-acquisition-information storing unit 130 (step S612). The request receiving unit 102 sends the edited information to the UI processing unit 101 (step S613). The UI processing unit 101 outputs the edited information to the display screen and the like. Alternatively, the UI processing unit 101 transmits the edited information to the other information processing apparatuses connected to the information processing apparatus 100 via the network.

Figure 10:
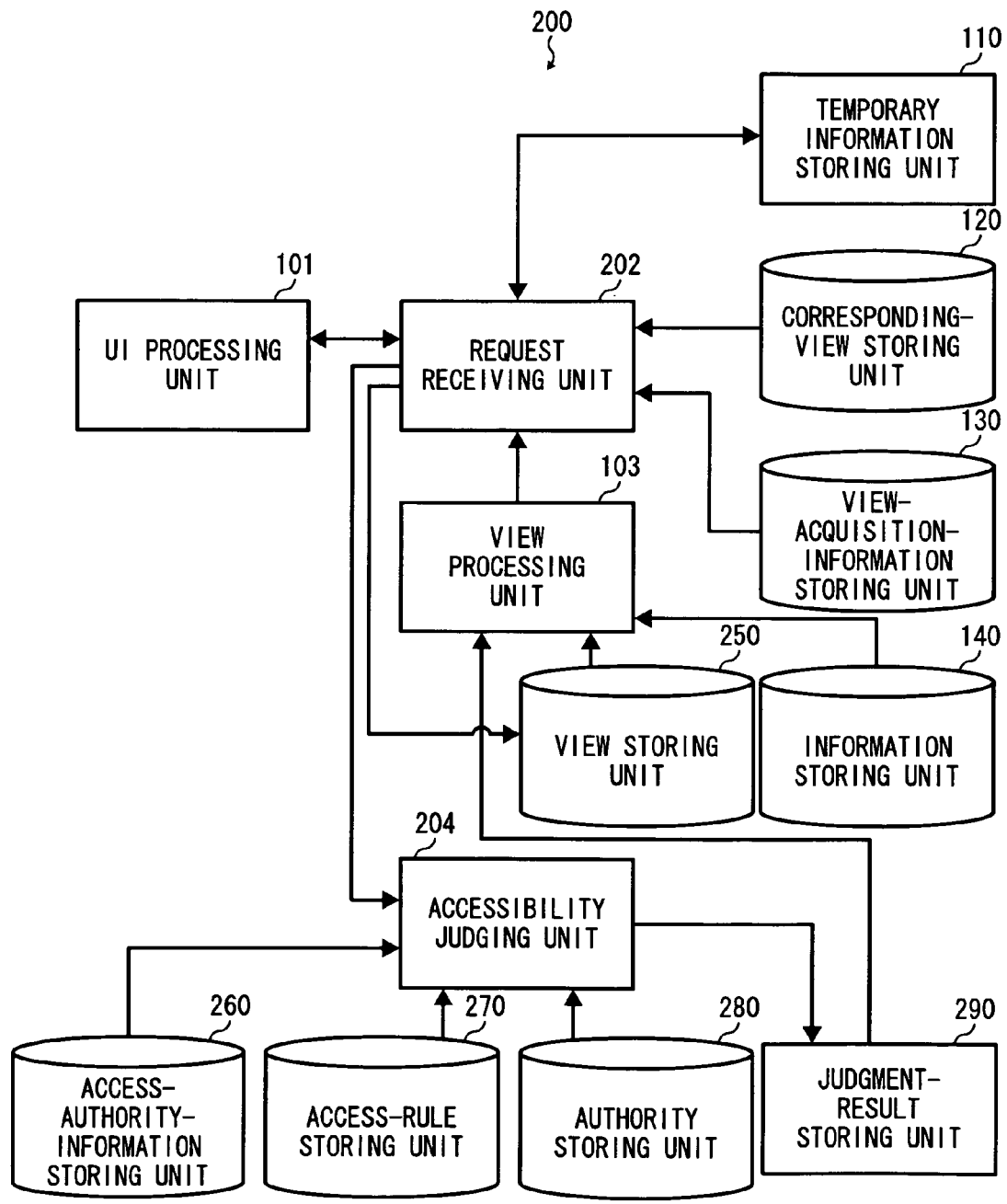
FIG. 10 is a block diagram of a structure of an information processing apparatus according to a second embodiment of the present invention.

FIG. 10 is a block diagram of a structure of an information processing apparatus according to a second embodiment of the present invention. In the following explanation of the second embodiment, components identical with those in the first embodiment are denoted by the identical reference numerals and signs and explanations of the components are omitted. Only differences from the first embodiment are explained.

An information processing apparatus 200 according to this embodiment includes the UI processing unit 101, a request receiving unit 202, the view processing unit 103, an accessibility judging unit 204, the temporary information storing unit 110, the corresponding-view storing unit 120, the view-acquisition-information storing unit 130, the information storing unit 140, a view storing unit 250, an access-authority-information storing unit 260, an access-rule storing unit 270, an authority storing unit 280, and a judgment-result storing unit 290.

Structures and functions of the UI processing unit 101, the view processing unit 103, the temporary information storing unit 110, the corresponding-view storing unit 120, the view-acquisition-information storing unit 130, and the information storing unit 140 are the same as those in the first embodiment. Therefore, explanations of the structures and the functions are omitted.

The access-authority-information storing unit 260 stores user types of which access to views is permitted, for the view processing unit 103, for example, for each address book view or department group view. FIG. 11 is a diagram of an example of a data structure of the access-authority-information storing unit 260. The access-authority-information storing unit 260 stores a view name and access authority information in association with each other. The access authority information sets user types, access of which to views is permitted. The user types are classified accounts used by users to log in to a system, for example, "guest user", "administrator", and the like shown in FIG. 12 described later. Since access possibilities are set for the user types, it is possible to set access authority for the users even if access authority is not set for the respective accounts. In other words, setting access authority for each of the user types is equivalent to setting access authority for each of the accounts.

The access-rule storing unit 270 stores access rules set for the entire system. As the access rules, it is possible to set three types, "open side", "closed side", and "all necessary". "Open side" is a rule for allowing a user type having weakest access authority to access all of a plurality of views if the user type has access authority for at least one of the views. "Closed side" is a rule for allowing a user type having strongest authority to access all of a plurality of views if the user type has access authority for at least one of the views. "All necessary" is a rule for allowing a user type to access all of a plurality of views when the user type has access authority for all the views.

The authority storing unit 280 stores the levels of access authority of the respective user types. FIG. 12 is a diagram for explaining an example of a data structure of the authority storing unit 280. The authority storing unit 280 stores a user type and the level of access authority in association with each other.

In addition to the structure and the function of the request receiving unit 102 described above, the request receiving unit 202 requests the accessibility judging unit 204 to judge possibility of access to the view processing unit 103 by a user. In addition to the processing for acquiring information from the information storing unit 140, the view storing unit 250 stores a view (a processing program) for inquiring the accessibility judging unit 204 about accessibility of the user before information acquisition is requested to the information storing unit 140 or the temporary information storing unit 110. The accessibility judging unit 204 judges whether a user type corresponding to an account is accessible to the information acquisition processing performed by using a plurality of views.

The judgment-result storing unit 290 stores a result of the judgment by the accessibility judging unit 204 on possibility of access to the information acquiring processing performed by using a plurality of views.

Figure 13A:
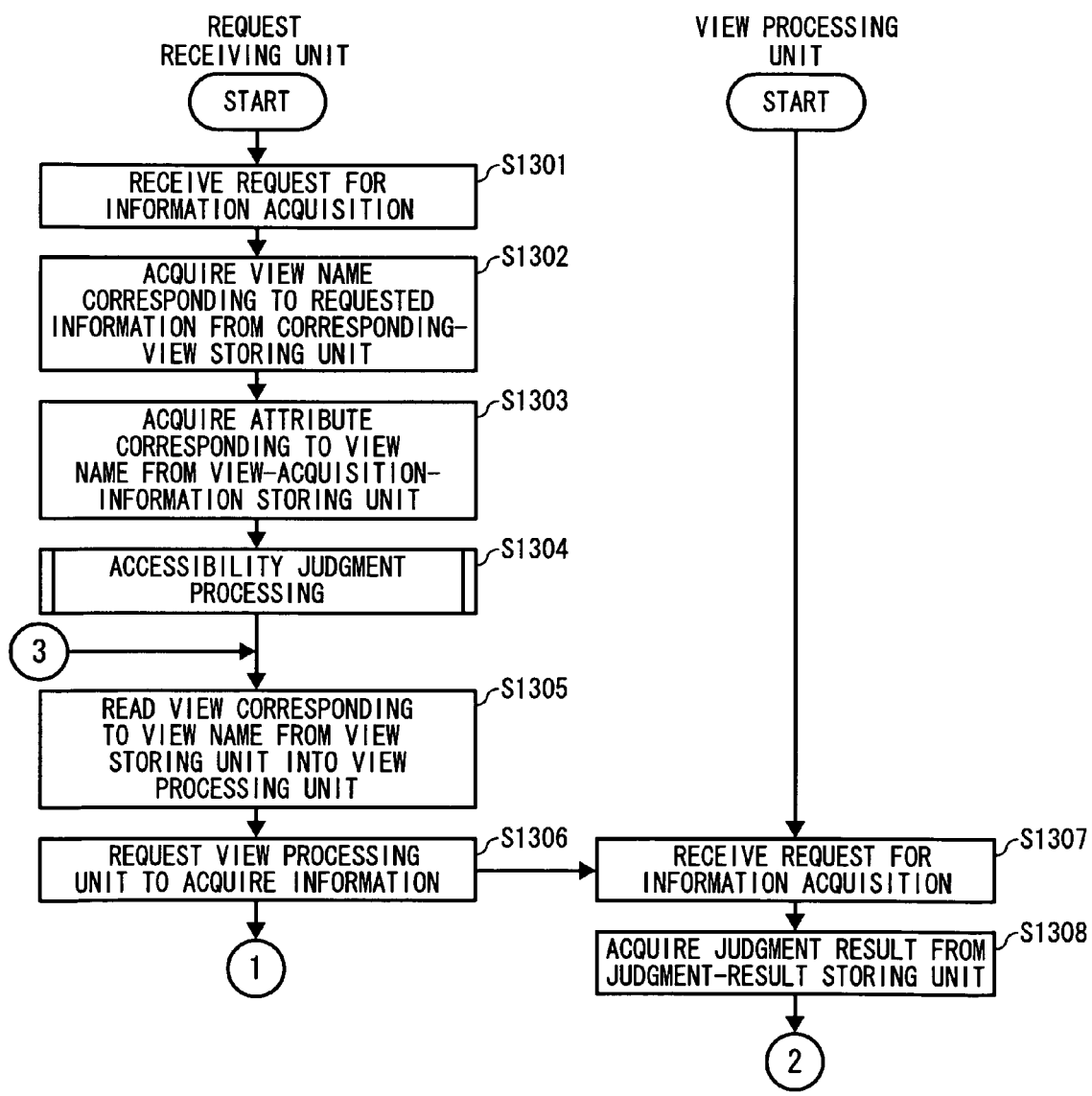
FIGS. 13A and 13B are flowcharts of an information acquisition procedure performed by a request receiving unit and a view processing unit.
Figure 13B:
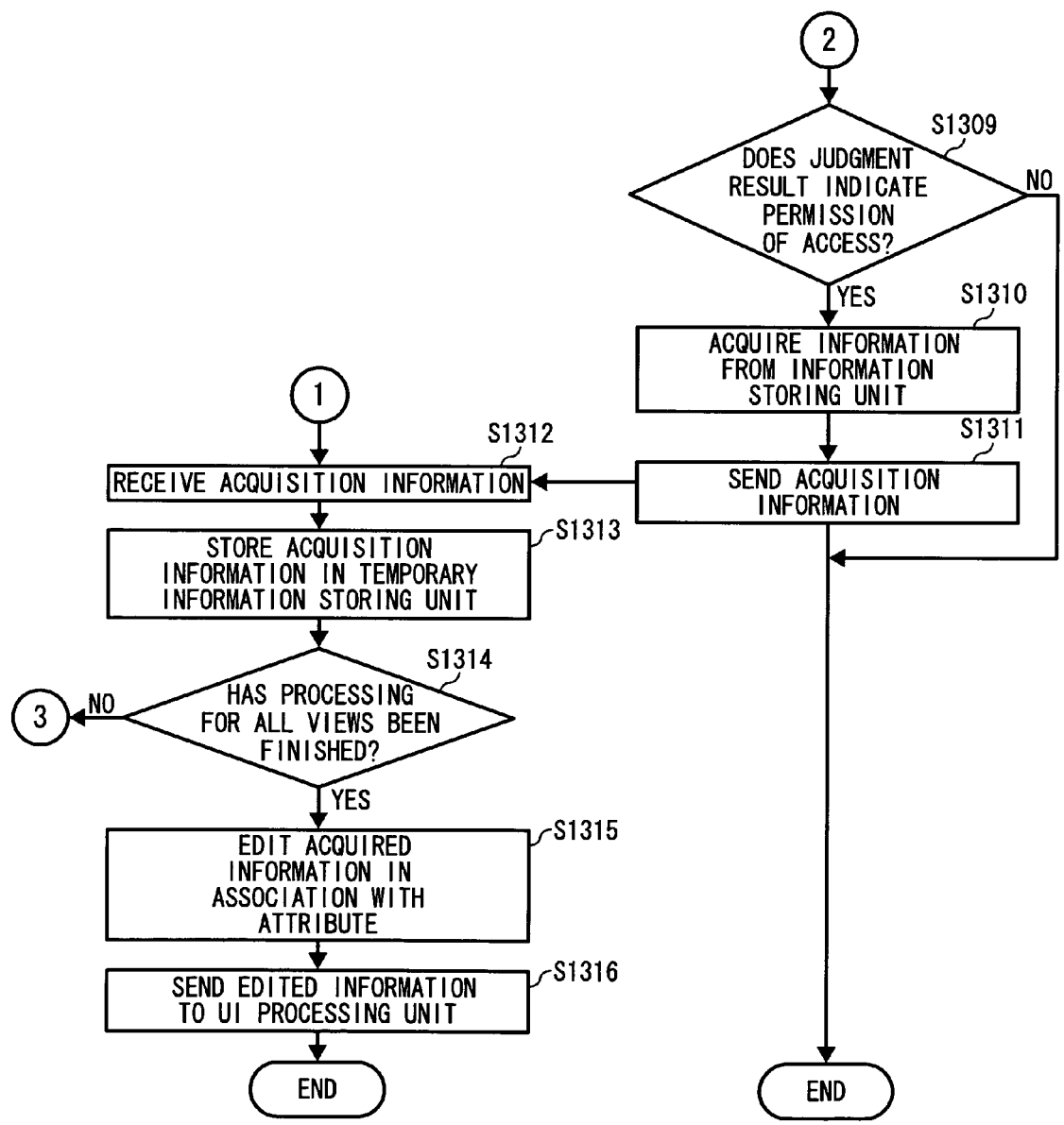

FIG. 13 is a flowchart of an information acquisition processing procedure performed by the request receiving unit and the view processing unit of the information processing apparatus 200.

The request receiving unit 202 receives a request for information acquisition inputted by the UI processing unit 101 (step S1301). The request receiving unit 202 acquires a view name corresponding to the requested information from the corresponding-view storing unit 120 (step S1302). The request receiving unit 202 further acquires an attribute corresponding to the acquired view name from the view-acquisition-information storing unit 130 (step S1303). The request receiving unit 202 performs accessibility judgment processing (step S1304). Details of the accessibility judgment processing are described later. The request receiving unit 202 reads a view corresponding to the view name from the view storing unit 150 into the view processing unit 103 (step S1305). The request receiving unit 202 requests the view processing unit 103 to acquire information (step S1306).

The view processing unit 103 receives a request for information acquisition from the request receiving unit 202 (step S1307). The view processing unit 103 acquires a judgment result from the judgment-result storing unit 290 (step S1308). The view processing unit 103 judges whether the judgment result is "access permitted" (step S1309). When it is judged that the judgment result is not "access permitted" ("No" at step S1309), the view processing unit 103 leaves the processing.

When it is judged that the judgment result is "access permitted" ("Yes" at step S1309), the view processing unit 103 acquires the requested information from the information storing unit 140 or the temporary information storing unit 110 (step S1310). The view processing unit 103 sends the acquired information to the request receiving unit 202 (step S1311).

The request receiving unit 202 receives the acquired information (step S1312). The request receiving unit 202 stores the acquired information in the temporary information storing unit 110 (step S1313). The request receiving unit 202 judges whether the processing for all the views has been finished (step S1314). When it is judged that the processing for all the views has not been finished ("No" at step S1314), the request receiving unit 202 returns to step S1305 and executes the processing for the remaining views.

When it is judged that the processing for all the views has been finished ("Yes" at step S1314), the request receiving unit 202 edits the acquired information in association with the attributes acquired from the view-acquisition-information storing unit 130 (step S1315). The request receiving unit 202 sends the edited information to the UI processing unit 101 (step S1316). The UI processing unit 101 outputs the edited information to a display screen and the like. Alternatively, the UI processing unit 101 transmits the edited information to other information processing apparatuses connected to the information processing apparatus 200 connected via a network.

Figure 14:
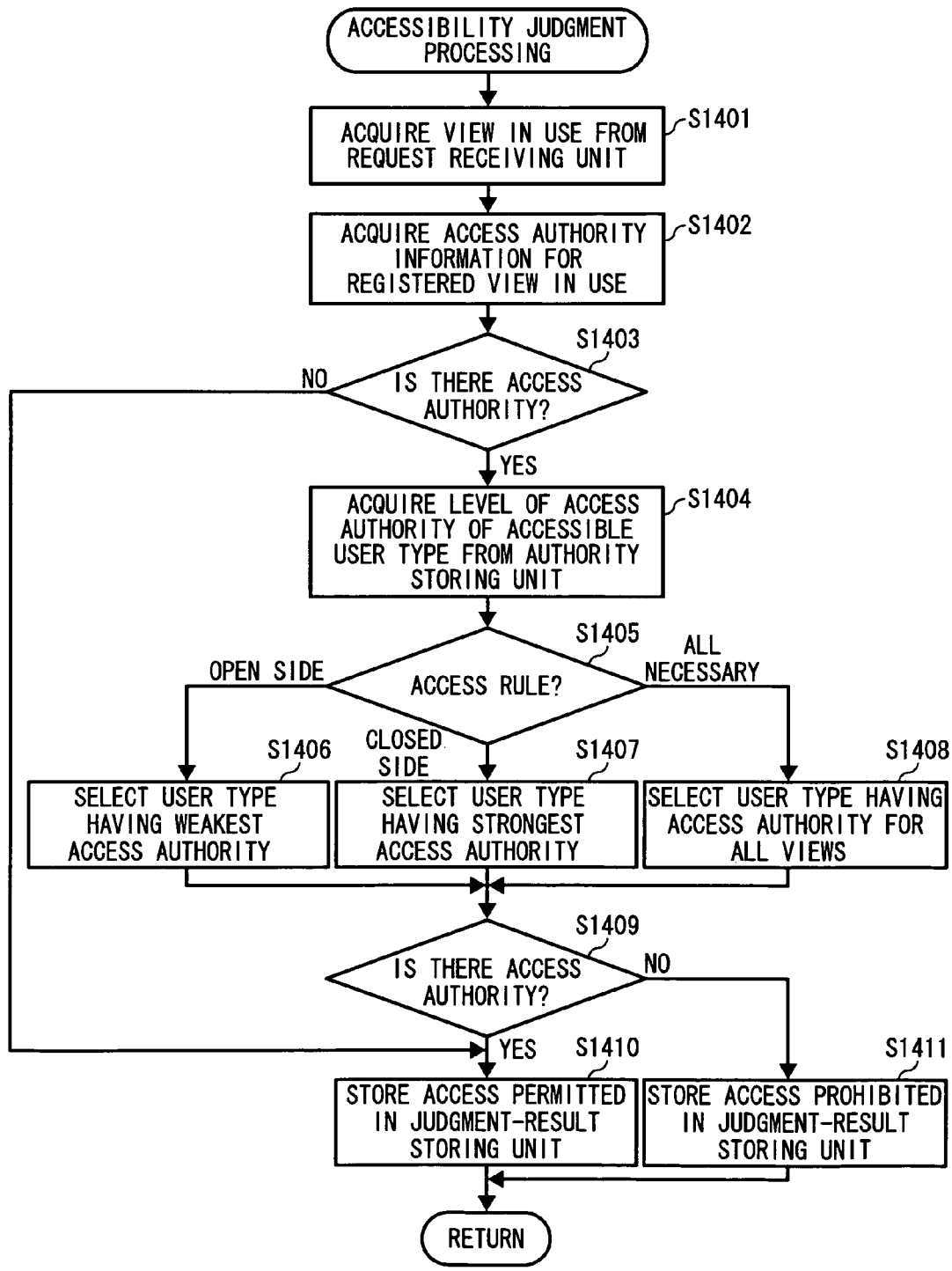
FIG. 14 is a flowchart of an accessibility judgment processing performed by an accessibility judging unit.

FIG. 14 is a flowchart of an accessibility judgment processing procedure performed by the accessibility judging unit 204.

The accessibility judging unit 204 acquires a view in use from the request receiving unit 202 (step S1401). The accessibility judging unit 204 acquires access authority information for the view in use from the access-authority-information storing unit 260 (step S1402). The accessibility judging unit 204 judges whether there is access authority information for the view in use (step S1403). When it is judged that there is no access authority information for the view in use ("No" at step S1403), i.e., when access authority for the view in use is not set and all users are permitted to access the view in use, the accessibility judging unit 204 proceeds to step S1410.

When it is judged that there is access authority information for the view in use ("Yes" at step S1403), the accessibility judging unit 204 acquires the levels of access authority of accessible user types from the authority storing unit 280 (step S1404). The accessibility judging unit 204 further acquires access rules from the access-rule storing unit 270 and judges which of the access rules should be applied (step S1405).

When it is judged that the access rule is "open side" ("open side" at step S1405), the accessibility judging unit 204 selects a user type having weakest access authority (step S1406). When it is judged that the access rule is "closed side" ("closed side" at step S1405), the accessibility judging unit 204 selects a user type having strongest access authority (step S1407). When it is judged that the access rule is "all necessary" ("all necessary" at step S1405), the accessibility judging unit 204 selects a user type having access authority for all the views (step S1408).

The accessibility judging unit 204 judges whether a user has access authority (step S1409). In other words, when the access rule is "open side" or "closed side", the accessibility judging unit 204 judges that an account used by the user has access authority if the level of a user type to which the account used by the user belongs is equal to or higher than the level of the selected user type. When the access rule is "all necessary", the accessibility judging unit 204 judges that the account used by the user has access authority if the user type to which the account used by the user is equal to the selected user type.

Figure 15:
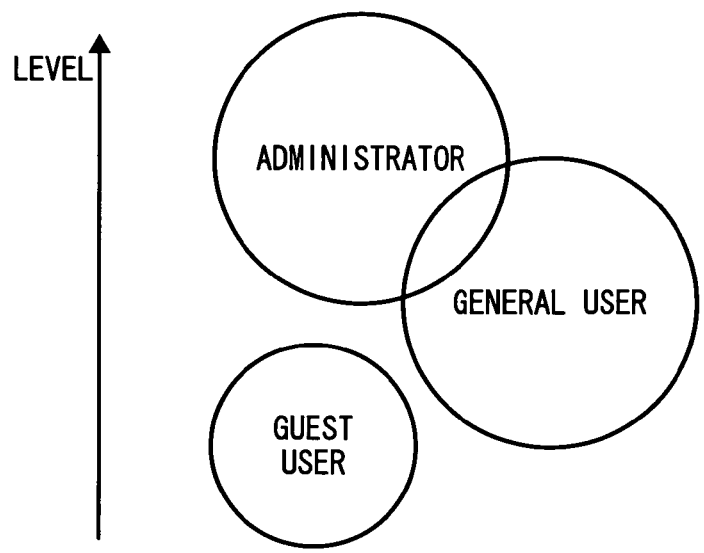
FIG. 15 is a diagram for explaining an example of access authority ranges of respective user types in the embodiment.
Figure 16:
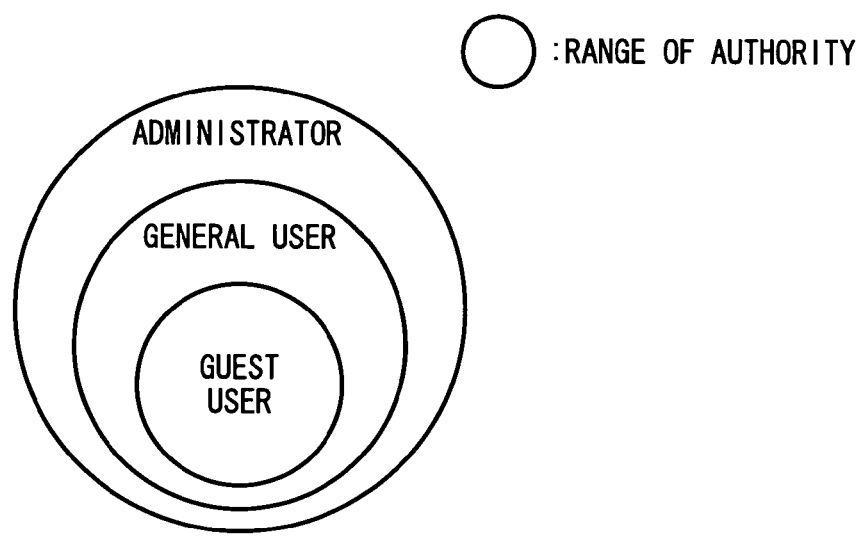
FIG. 16 is a diagram for explaining an example of access authority ranges of respective user types in the related art.

FIG. 15 is a diagram for explaining an example of access authority ranges of respective user types in this embodiment. FIG. 16 is a diagram for explaining an example of access authority ranges of respective user types in the related art. In the past, the access authority ranges are defined as an inclusion relation shown in FIG. 16. Consequently, access permitted for a lower-order user type (e.g., a guest user) is permitted for a higher-order user type (e.g., a general user) at any time. Therefore, it is impossible to give authority to only the lower-order user type.

On the other hand, it is possible to set the access authority ranges for the respective user types in this embodiment as shown in FIG. 15 by performing the setting and the processing described above. In other words, a user type having strong access authority and a user type having weak access authority are not in an inclusion relation. For example, when the access rule is set as "all necessary", even if the user type having weak access authority is permitted to access a view, the user type having strong access authority may not be permitted to access the view. To realize the inclusion relation in the past, the access rule only has to be set to permit access when a user type has strongest access authority, i.e., set on "closed side".

Referring back to FIG. 14, when it is judged that the account used by the user has access authority ("Yes" at step S1409), the accessibility judging unit 204 stores "access permitted" in the judgment-result storing unit 290 (step S1410). When it is judged that the account used by the user does not have access authority ("No" at step S1409), the accessibility judging unit 204 stores "access prohibited" in the judgment-result storing unit 290 (step S1411).

In this way, the level of access authority is set in a view itself and accessibility is controlled by the access rules. Consequently, it is possible to easily set access authority for information intended by an administrator. Access authority may be set in information itself. This makes it possible to realize firmer security.

Figure 17B:
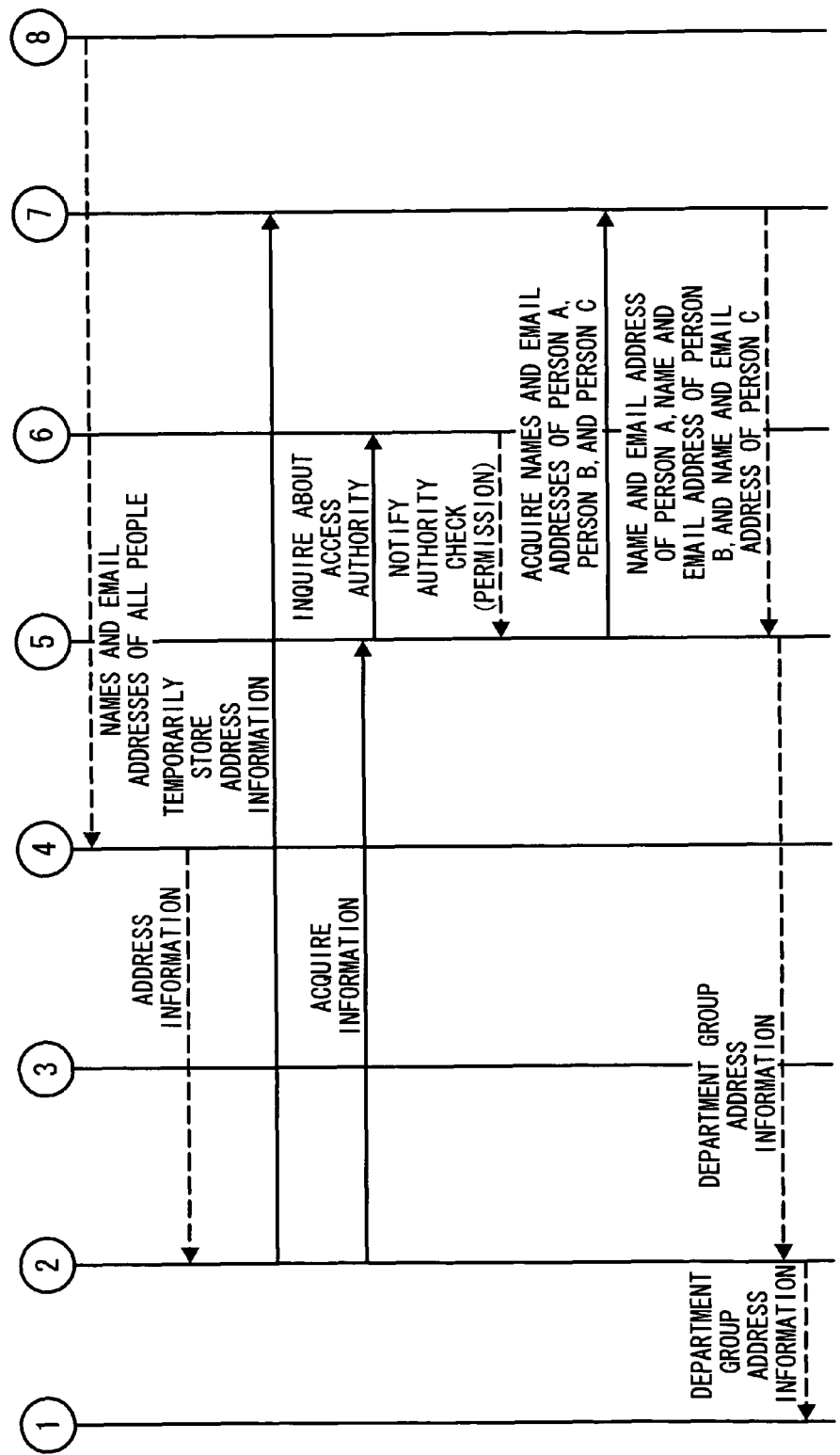
Figure 18:
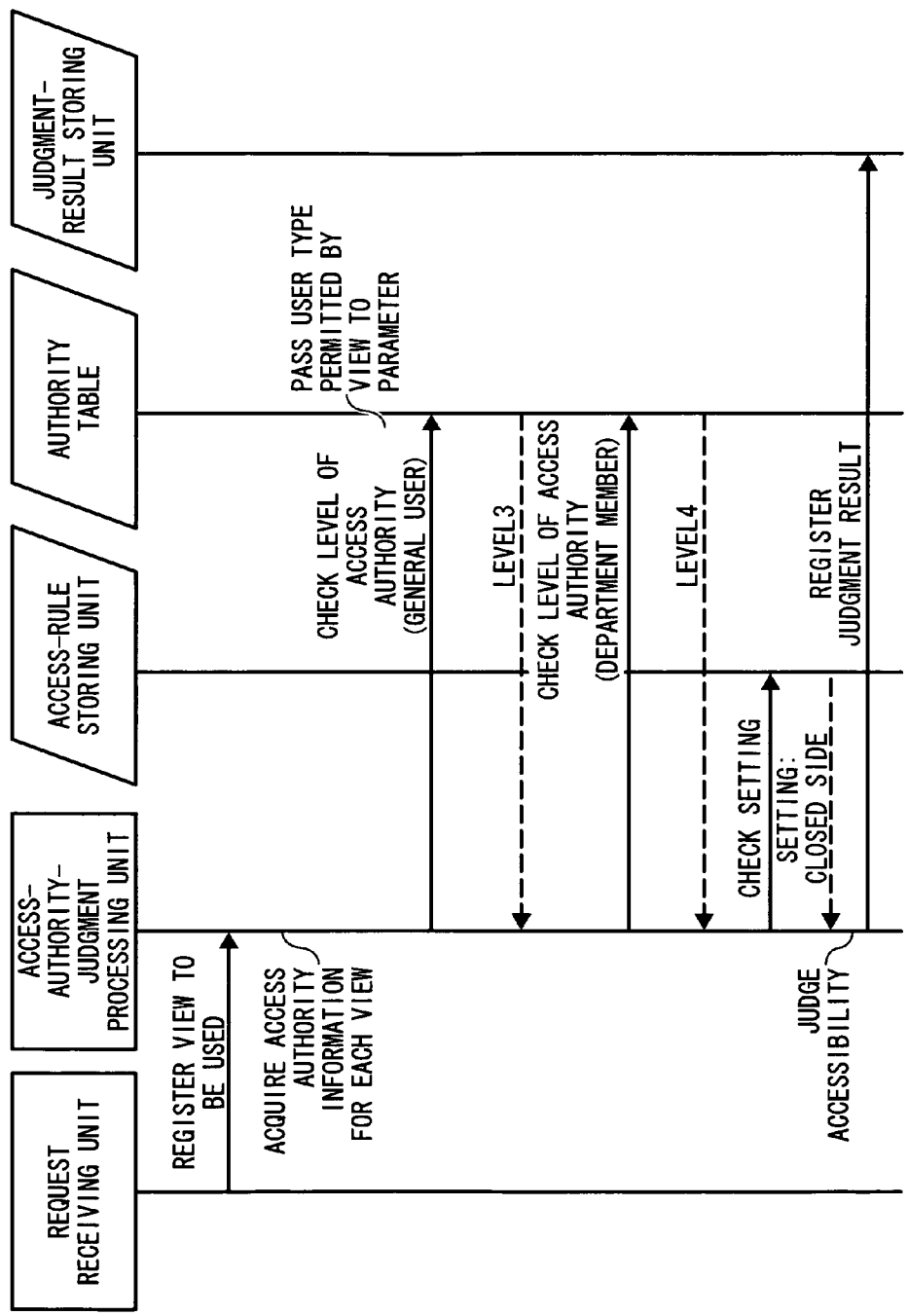
FIG. 18 is a diagram for explaining a flow of access judgment processing performed by the accessibility-judging unit.

FIG. 17 is a diagram for explaining a flow of processing for acquiring department group address information according to the flow of the flowchart shown in FIG. 13. FIG. 18 is a diagram for explaining a flow of access judgment processing by the accessibility judging unit according to the flow of the flowchart shown in FIG. 14. In FIGS. 17 and 18, a flow of information is mainly explained.

In FIG. 17, the request receiving unit 202 receives a request for "department group address information" inputted by the UI processing unit 101 (step S1301). The request receiving unit 202 acquires view names "address book view" and "department group view" corresponding to the requested "department group address information" from the corresponding-view storing unit 120 (step S1302). The request receiving unit 202 further acquires attributes corresponding to the acquired view names from the view-acquisition-information storing unit 130 (step S1303). Specifically, the request receiving unit 202 acquires attributes "name" and "Email address" corresponding to the view name "address book view" and attributes "all attributes of Person A", "all attributes of Person B", and "all attributes of Person C" corresponding to the view name "department group view".

In FIG. 18, the accessibility judging unit 204 acquires views in use "address book view" and "department group view" from the request receiving unit 202 (step S1401). The accessibility judging unit 204 acquires access authority information for the views in use from the access-authority-information storing unit 260 (step S1402). Specifically, the accessibility judging unit 204 acquires access authority information "general information" for the view in use "address book view" and acquires access authority information "department member" for the view in use "department group view".

The accessibility judging unit 204 judges that there is access authority information for the view in use ("Yes" at step S1403) and acquires the levels of access authority of accessible user types from the authority storing unit 280 (step S1404). Specifically, the accessibility judging unit 204 acquires the level "3" of access authority of "general user", which is a user type permitted to access the "address book view" by the "address book view", and acquires the level "4" of access authority of "department member", which is a user type permitted to access the "department group view" by the department group view". The accessibility judging unit 204 acquires the access rules from the access-rule storing unit 270 and judges which of the access rules is applied (step S1405). In this example, "closed side" is acquired.

Since it is judged that the access rule is "closed side" ("closed side" at step S1405), the accessibility judging unit 204 selects "department member", which is a user type having strongest access authority (step S1407). The accessibility judging unit 204 judges whether the user has access authority (step S1409). For example, when a user type to which an account used by the user belongs is "department member", the access rule is "closed side" and the level "4" of the user type "department member" to which the account used by the user belongs is equal to the level "4" of the selected user type "department member". Thus, the accessibility judging unit 204 judges that the account used by the user has access authority. When, for example, the user type to which the account used by the user belongs is "general user", the access rule is "closed side" and the level "3" of the user type "general user" to which the account used by the user belongs is smaller than the level "4" of the selected user type "department member". Thus, the accessibility judging unit 204 judges that the account used by the user has access authority ("Yes" at step S1409) and stores "access permitted" in the judgment-result storing unit 290 (step S1410).

Referring back to FIG. 17, the request receiving unit 202 reads a view "address book view" corresponding to the view name "address book view" from the view storing unit 150 into the view processing unit 103 (step S1305). The request receiving unit 202 requests the view processing unit 103, i.e., the "address book view", to acquire information (step S1306).

The view processing unit 103 (address book view) receives a request for information acquisition from the request receiving unit 202 (step S1307). The view processing unit 103 (address book view) acquires a judgment result from the judgment-result storing unit 290 (step S1308) and judges that the judgment result is "access permitted" ("Yes" at step S1309).

The view processing unit 103 (address book view) acquires the requested information from the information storing unit 140 (step S1310). Specifically, the view processing unit 103 (address book view) acquires information corresponding to the name and the Email address. The view processing unit 103 (address book view) sends the acquired information to the request receiving unit 202 (step S1311).

The request receiving unit 202 receives the acquired information (step S1312). The request receiving unit 202 stores the acquired information in the temporary information storing unit 110 (step S1313). When the request receiving unit 202 judges that the processing for all the views has not been finished ("No" at step S1314), the request receiving unit 202 returns to step S1305.

The request receiving unit 202 reads a view "department group view" corresponding to the view name "department group view" from the view storing unit 150 into the view processing unit 103 (step S1305). The request receiving unit 202 requests the view processing unit 103, i.e., the "department group view", to acquire information (step S1306).

The view processing unit 103 (department group view) receives a request for information acquisition from the request receiving unit 202 (step S1307). The view processing unit 103 (department group view) acquires a judgment result from the judgment-result storing unit 290 (step S1308) and judges that the judgment result is "access permitted" ("Yes" at step S1309).

The view processing unit 103 (department group view) acquires the requested information from the temporary information storing unit 110 (step S1310). Specifically, the view processing unit 103 (department group view) acquires information on Person A, Person B, and Person C from information corresponding to the names and the Email addresses of all the members. The view processing unit 103 (department group view) sends the acquired information to the request receiving unit 202 (step S1311).

The request receiving unit 202 receives the acquired information (step S1312) and stores the acquired information in the temporary information storing unit 110 (step S1313).

When it is judged that the processing for all the views has been finished ("Yes" at step S1314), the request receiving unit 202 edits the acquired information in association with the attributes acquired from the view-acquisition-information storing unit 130 (step S1315). The request receiving unit 202 sends the edited information to the UI processing unit 101 (step S1316). The UI processing unit 101 outputs the edited information to the display screen and the like. Alternatively, the UI processing unit 101 transmits the edited information to the other information processing apparatuses connected to the information processing apparatus 200 connected via the network.

Figure 19:
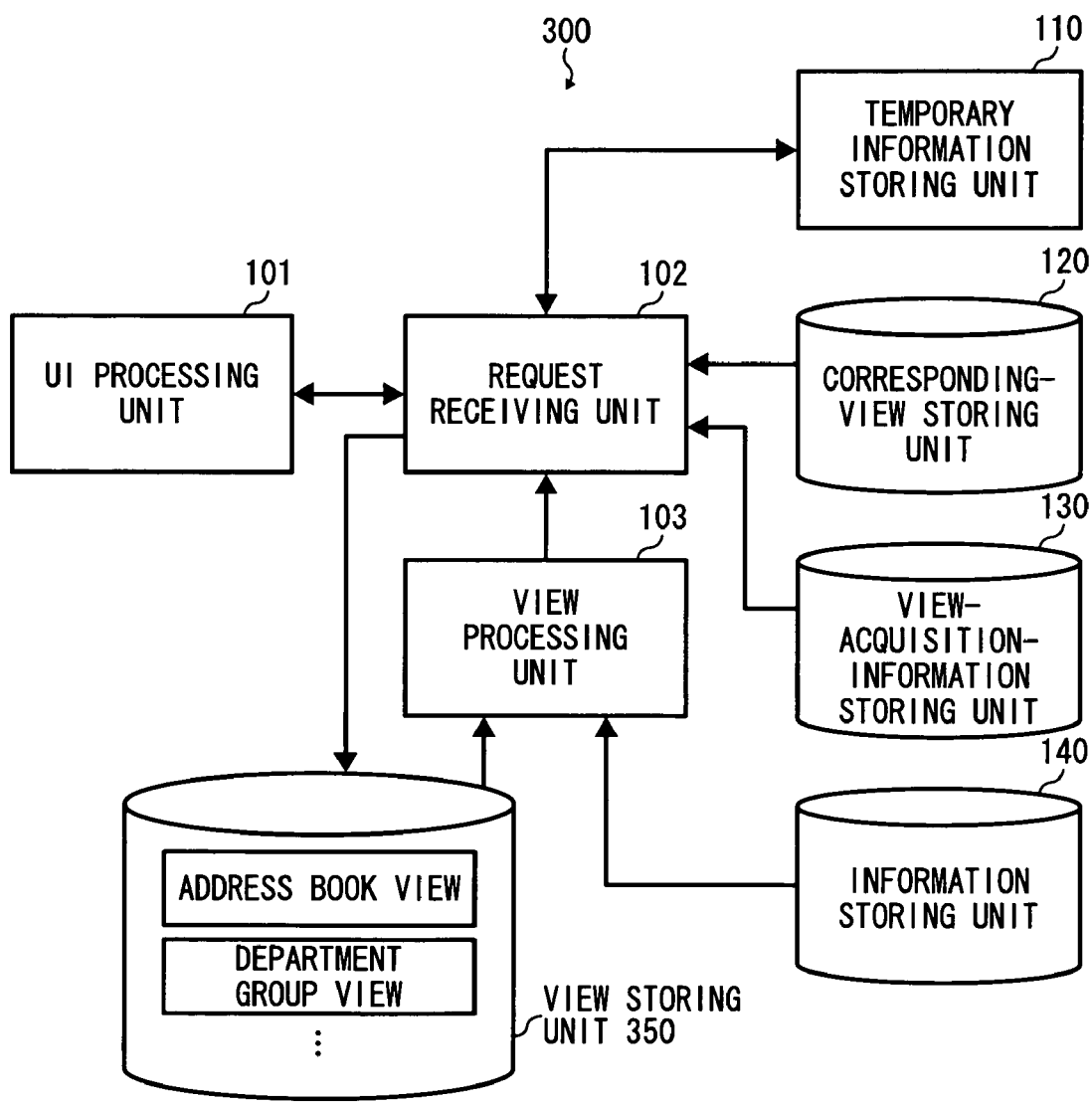
FIG. 19 is a block diagram of a structure of an information processing apparatus according to a third embodiment of the present invention.

FIG. 19 is a block diagram of a structure of an information processing apparatus according to a third embodiment of the present invention. In the following explanation of the third embodiment, components identical with those in the first embodiment are denoted by the identical reference numerals and signs and explanations of the components are omitted. Only differences from the first embodiment are explained.

An information processing apparatus 300 according to this embodiment includes the UI processing unit 101, the request receiving unit 102, the view processing unit 103, the temporary information storing unit 110, the corresponding-view storing unit 120, the view-acquisition-information storing unit 130, the information storing unit 140, and a view storing unit 350.

Structures and functions of the UI processing unit 101, the request receiving unit 102, the view processing unit 103, the temporary information storing unit 110, the corresponding-view storing unit 120, the view-acquisition-information storing unit 130, and the information storing unit 140 are the same as those in the first embodiment. Therefore, explanations of the structures and the functions are omitted.

In addition to the processing for acquiring information from the information storing unit 140 as described above, the view storing unit 350 stores a view (a processing program) for performing routine processing. As the routine processing, there are, for example, processing for generating an email for an acquired address and adding a standard sentence to a text and processing for setting "*****" as display characters when a password for an account is requested.

Figure 20:
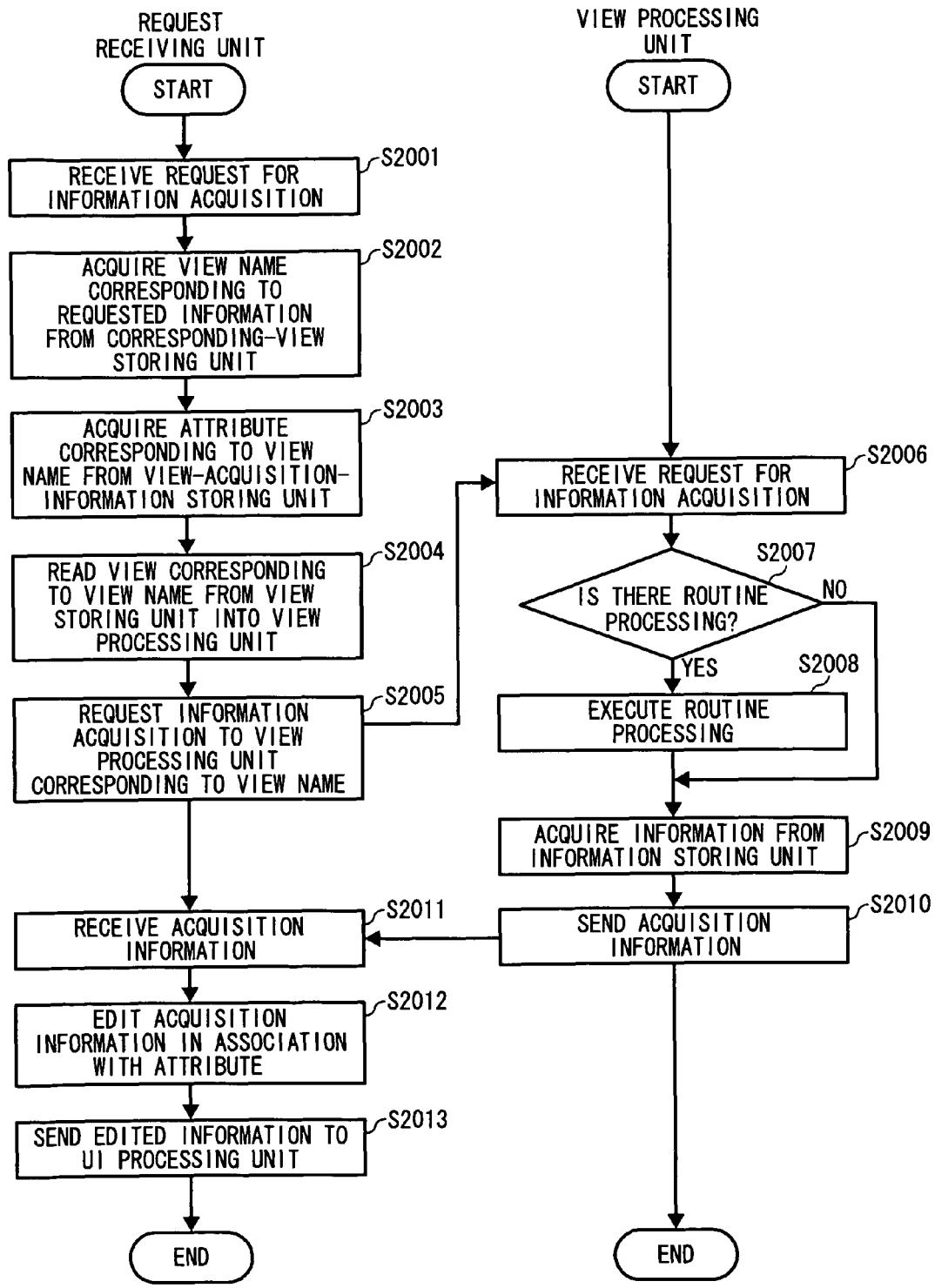
FIG. 20 is a flowchart of an information acquisition processing procedure with routine processing performed by a request receiving unit and a view processing unit.

FIG. 20 is a flowchart of an information acquisition processing procedure with routine processing performed by the request receiving unit and the view processing unit of the information processing apparatus 300.

The procedure of the information acquisition processing according to this embodiment is substantially the same as that in the flowchart shown in FIG. 5. Thus, only differences from the flowchart are explained. Concerning steps S2001 to S2005 and steps S2011 to S2013, the explanations of steps S501 to S505 and steps S509 to S511 in FIG. 5 apply. Here, explanations of the steps are omitted.

The view processing unit 103 receives a request for information acquisition from the request receiving unit 102 (step S2006). The view processing unit 103 judges whether there is routine processing (step S2007). When it is judged that there is no routine processing ("No" at step S2007), the view processing unit 103 proceeds to step S2009. When it is judged that there is routine processing ("Yes" at step S2007), the view processing unit 103 executes the routine processing (step S2008). The view processing unit 103 acquires the requested information from the information storing unit 140 (step S2009). The view processing unit 103 sends the acquired information to the request receiving unit 102 (step S2010). The view processing unit 103 may always perform the routine processing without judging presence or absence of the routine processing.

It is possible to incorporate the routine processing in the information acquisition processing in this way. Therefore, since it is possible to apply processing decided in advance to the acquired information without oversights, it is possible to improve work efficiency.

Figure 21:
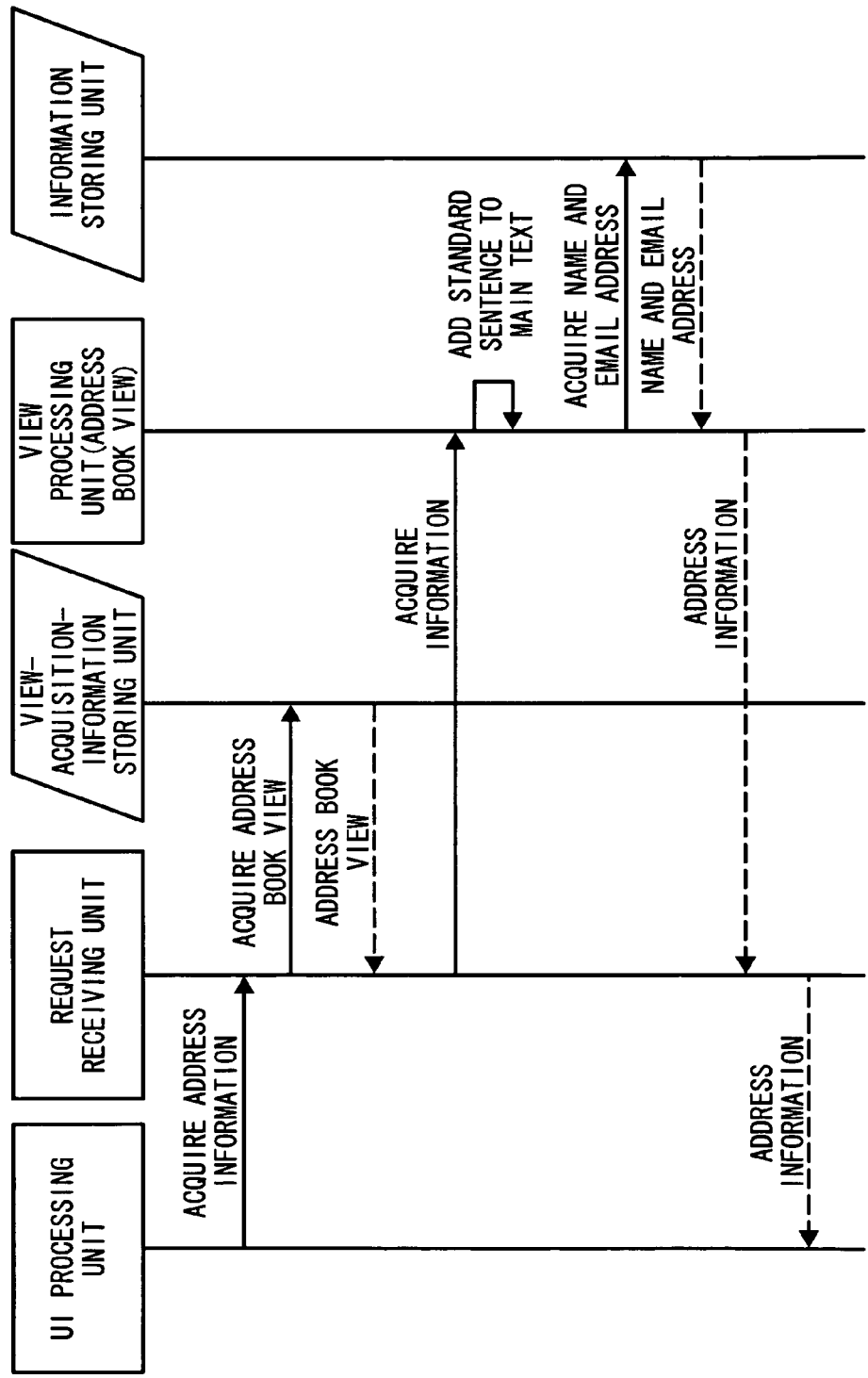
FIG. 21 is a diagram for explaining a flow of processing for acquiring address information with routine processing.

FIG. 21 is a diagram for explaining a flow of processing for acquiring address information with routine processing according to the flow of the flowchart shown in FIG. 20. In FIG. 21, a flow of information is mainly explained.

The request receiving unit 102 receives a request for "address information" inputted by the UI processing unit 101 (step S2001). The request receiving unit 102 acquires a view name "address book view" corresponding to the requested information "address information" from the corresponding-view storing unit 120 (step S2002). The request receiving unit 102 further acquires attributes "name" and "Email address" corresponding to the view name "address book view" from the view-acquisition-information storing unit 130 (step S2003). The request receiving unit 102 reads a view "address book view" corresponding to the view name "address book view" from the view storing unit 350 into the view processing unit 103 (step S2004). The request receiving unit 102 requests the view processing unit 103, i.e., the "address book view", to acquire information (step S2005).

The view processing unit 103 (address book view) receives the request for information acquisition from the request receiving unit 102 (step S2006). The view processing unit 103 judges that there is routine processing ("Yes" at step S2007) and executes the routine processing (step S2008). In this example, the view processing unit 103 performs routine processing for adding a standard sentence to an email text. The view processing unit 103 acquires the requested information from the information storing unit 140 (step S2009). The view processing unit 103 sends the acquired information to the request receiving unit 102 (step S2010). The view processing unit 103 may further perform processing for setting the acquired Email address as a destination of a transmission email.

The request receiving unit 102 receives the acquired information (step S2011). The request receiving unit 102 edits the acquired information in association with the attributes acquired from the view-acquisition-information storing unit 130 (step S2012). The request receiving unit 102 sends the edited information to the UI processing unit 101 (step S2013). The UI processing unit 101 outputs the edited information to a display screen and the like. Alternatively, the UI processing unit 101 transmits the edited information to other information processing apparatuses connected to the information processing apparatus 300 via a network.

Therefore, when such a view is used, it is possible to easily add the standard sentence to data for email transmission. Even when the text is changed, it is possible to add the identical standard sentence to the text and transmit the text to a person to whom the email is transmitted.

Figure 22:
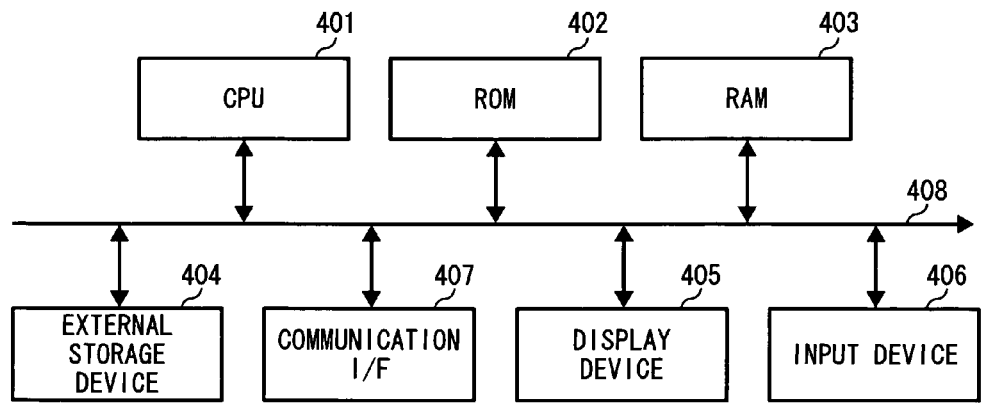
FIG. 22 is a diagram of a hardware configuration of a personal computer (PC) that executes an information acquiring program for realizing a function of the information processing apparatus according to the embodiment.

FIG. 22 is a diagram of a hardware configuration of a personal computer (PC) that executes an information acquiring program for realizing the functions of the information processing apparatuses according to the embodiments described above. The PC includes a control device such as a central processing unit (CPU) 401, storage devices such as a read only memory (ROM) 402 and a random access memory (RAM) 403, external storage devices 404 such as a hard disk (HD) and a compact disk (CD), a display device 405 such as a display, input devices 406 such as a keyboard and a mouse, a communication interface 407 that connects the PC to an external network, and a bus 408 that connects these devices. A usual computer is used as the PC.

The information acquiring program may operate on the PC in a state of middleware incorporated in the PC or may be executed by the PC as an independent program.

The information acquiring program executable by the PC is recorded in a computer-readable recording medium such as a compact disk-read only memory (CD-ROM), a flexible disk (FD), a compact disk-recordable (CD-R), or a digital versatile disk (DVD) as a file of an installable format or an executable format and provided.

The information acquiring program executable by the PC may be stored on a computer connected to a network such as the Internet, downloaded through the network, and provided. The information acquiring program executable by the PC may be provided or distributed through the network such as the Internet.

The information acquiring program may be incorporated in a ROM or the like and provided.

The information processing program executed on the PC is formed as a module including the respective units described above (the request receiving unit, the view processing unit, the accessibility judging unit, etc.). As actual hardware, when the CPU reads out the information acquiring program from the recording medium, the respective units are loaded on a main storage and the request receiving unit, the view processing unit, the accessibility judging unit, and the like are generated on the main storage.

The temporary information storing unit 110, the corresponding-view storing unit 120, the view-acquisition-information storing unit 130, the information storing unit 140, the view storing units 150 and 350, the access-authority-information storing unit 260, the access-rule storing unit 270, the authority storing unit 280, and the judgment-result storing unit 290 may be any storage media generally used such as a hard disk, an optical disk, and a memory card.

Figure 23:
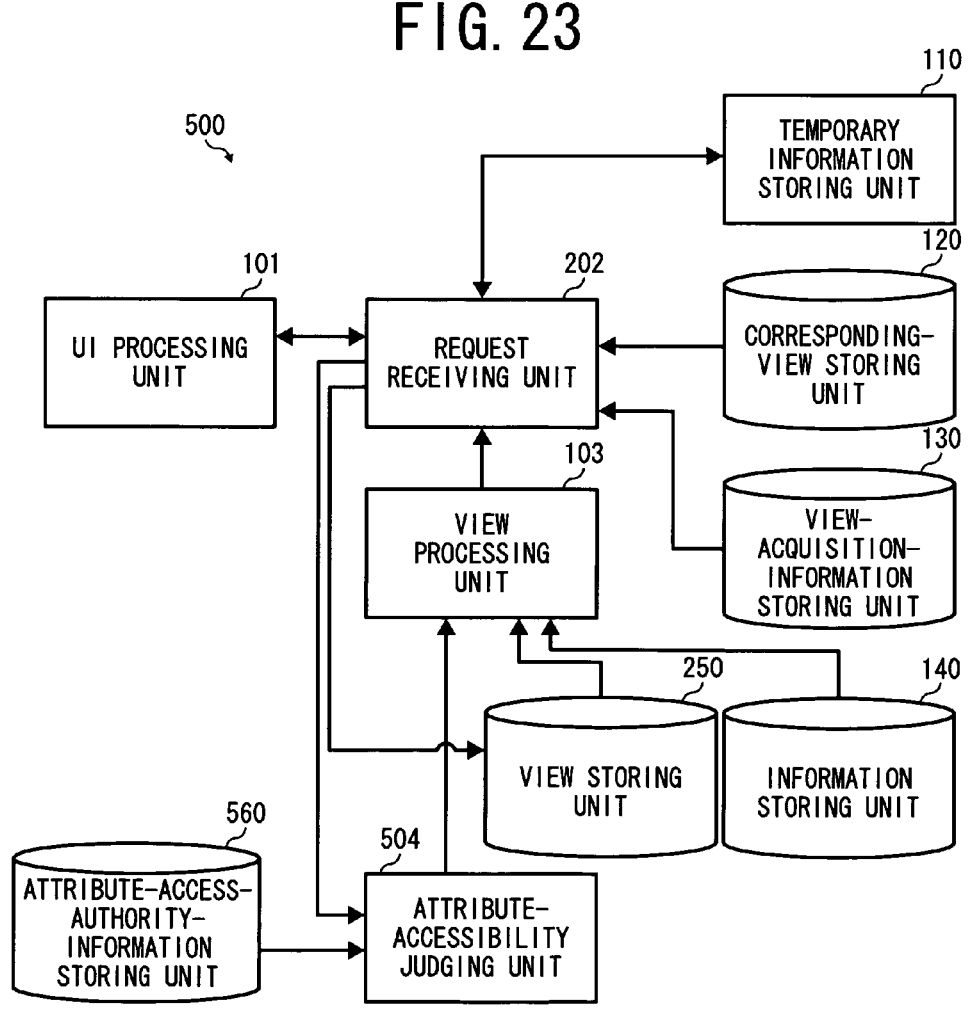
FIG. 23 is a block diagram of a structure of an information processing apparatus according to a fourth embodiment of the present invention.

FIG. 23 is a block diagram of a structure of an information processing apparatus according to a fourth embodiment of the present invention. In the following explanation of the fourth embodiment, components identical with those in the second embodiment are denoted by the identical reference numerals and signs and explanations of the components are omitted. Only differences from the second embodiment are explained.

An information processing apparatus 500 according to this embodiment includes the UI processing unit 101, the request receiving unit 202, the view processing unit 103, an attribute-accessibility judging unit 504, the temporary information storing unit 110, the corresponding-view storing unit 120, the view-acquisition-information storing unit 130, the information storing unit 140, the view storing unit 250, and an attribute-access-authority-information storing unit 560.

Structures and functions of the UI processing unit 101, the request receiving unit 202, the view processing unit 103, the temporary information storing unit 110, the corresponding-view storing unit 120, the view-acquisition-information storing unit 130, the information storing unit 140, and the view storing unit 250 are the same as those in the first or second embodiment. Therefore, explanations of the structures and the functions are omitted.

The attribute-access-authority-information storing unit 560 stores user types (users), access of which to views is permitted, for each attribute and operation. FIG. 24 is a diagram for explaining an example of a data structure of the attribute-access-authority-information storing unit 560. The attribute-access-authority-information storing unit 560 stores an attribute name, operation, and access authority information in association with one another. The operation is a method of handling information corresponding to attributes stored by the information storing unit 140. For example, operation "get" is operation for acquiring information from the information storing unit 140 and operation "set" is operation for storing information in the information storing unit 140. The access authority information sets user types, access of which to views is permitted, for each attribute and operation. Consequently, it is possible to set accessibility for each attribute and operation. Therefore, it is possible to perform access management for the information stored by the information storing unit 140 for each attribute and operation and flexibly perform access management.

The attribute-access-authority-information storing unit 560 may store an attribute name and access authority information in association with each other instead of storing an operation name, operation, and access authority information in association with one another. Consequently, it is possible to perform access management for the information stored by the information storing unit 140 for each attribute regardless of a type of operation for the attribute.

When the information stored by the information storing unit 140 is operated, the attribute-accessibility judging unit 504 refers to access authority corresponding to an attribute and operation stored by the attribute-access-authority-information storing unit 560 and judges accessibility to information concerning the attribute.

Figure 25A:
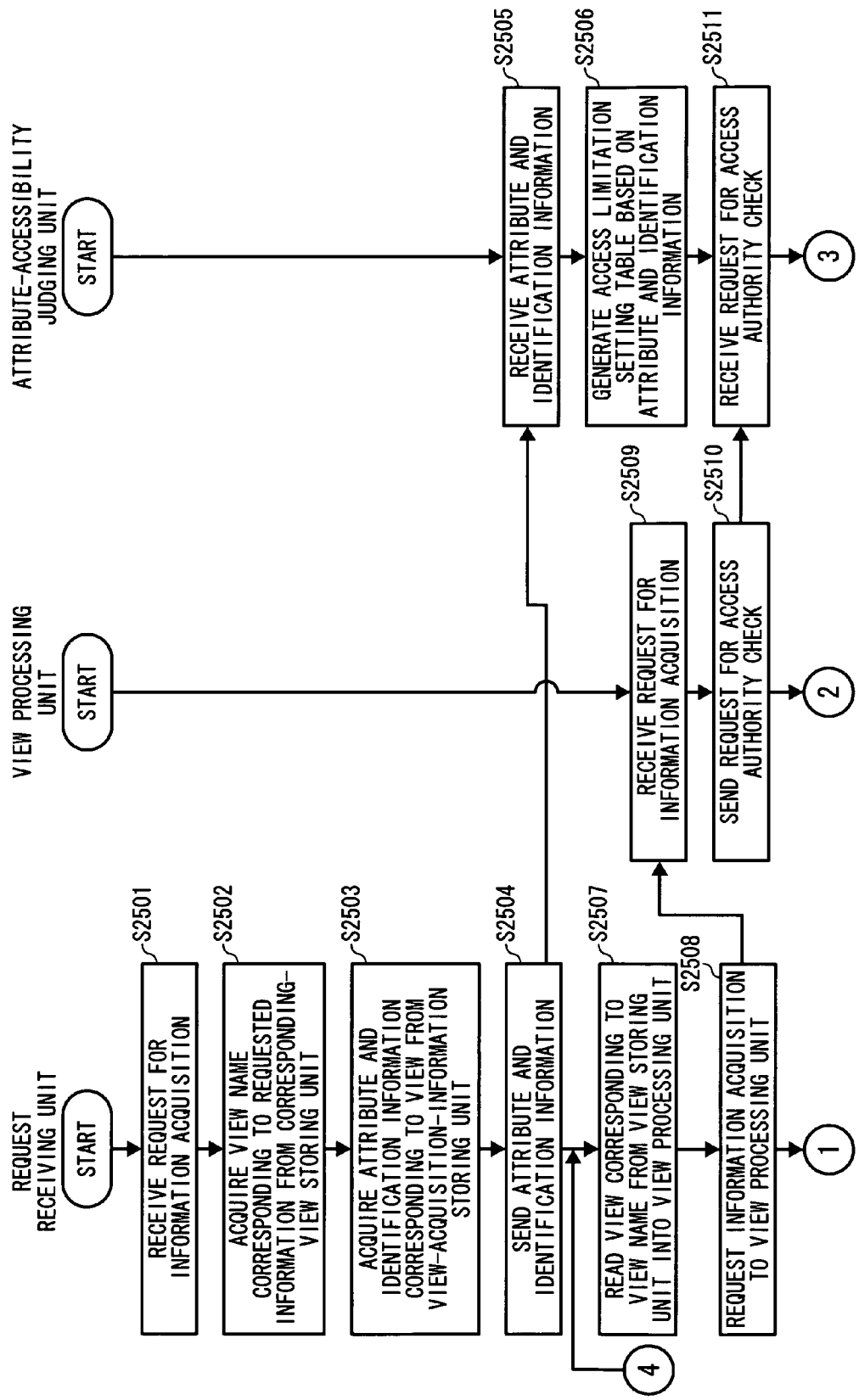

FIGS. 25A and 25B are flowcharts of an information acquisition processing procedure performed by the request receiving unit, the view processing unit, and the attribute-accessibility judging unit.

The request receiving unit 202 receives a request for information acquisition inputted by the UI processing unit 101 (step S2501). The request receiving unit 202 acquires a view name corresponding to the requested information from the corresponding-view storing unit 120 (step S2502). The request receiving unit 202 further acquires an attribute and identification information corresponding to the acquired view name from the view-acquisition-information storing unit 130 (step S2503). The identification information is information given to identify each of Person A, Person B, and Person C when information acquired by the view processing unit 103 is not all pieces of information corresponding to a specific attribute, for example, when information concerning only the three people, Person A, Person B, and Person C is acquired by a department group view. When all the pieces of information corresponding to the attribute are acquired, the identification information is unnecessary. The request receiving unit 202 sends the attribute and the identification information to the attribute-accessibility judging unit 504 (step S2504).

The attribute-accessibility judging unit 504 receives the attribute and the identification information (step S2505). The attribute-accessibility judging unit 504 generates an access limitation setting table based on the received attribute and identification information and the attribute-access-authority-information storing unit 560 (step S2506). The access limitation setting table is a table that indicates access limitation corresponding to the information acquisition processing by the view processing unit 103. FIG. 26 is a diagram for explaining an example of the access limitation setting table. Access limitation corresponding to the processing by the view processing unit 103 is shown as a list. In the table, identification information of a view (data) is information for identifying acquired information as described above. For example, information is identified by associating, for example, ID=1 and "Person A".

The request receiving unit 202 reads a view corresponding to the view name from the view storing unit 150 into the view processing unit 103 (step S2507). The request receiving unit 202 requests the view processing unit 103 to acquire information (step S2508).

The view processing unit 103 receives the request for information acquisition from the request receiving unit 202 (step S2509). The view processing unit 103 sends a request for access authority check to the attribute-accessibility judging unit 504 (step S2510).

The attribute-accessibility judging unit 504 receives the request for access authority check (step S2511). The attribute-accessibility judging unit 504 acquires information from the information storing unit 140 (step S2512). The attribute-accessibility judging unit 504 checks access authority for each attribute referring to the access limitation setting table (step S2513). For example, in the case shown in FIG. 26, when an attribute "name" is acquired (got), if a user type is "general user", since the user type has access authority, an access authority check result is set as "access authority is present". When an attribute "password" is acquired (got), if a user type is "general user", since the user type has no access authority, an access authority check result is set as "access authority is absent". The attribute-accessibility judging unit 504 sends the acquired information and the access authority check result to the view processing unit 103 (step S2514).

The view processing unit 103 receives the acquired information and the access authority check result (step S2515). The view processing unit 103 judges whether there is access authority from the access authority check result for each attribute (step S2516). When it is judged that there is access authority ("Yes" at step S2516), the view processing unit 103 stores the acquired information as an attribute value (step S2517). When it is judged that there is no access authority ("No" at step S2516), the view processing unit 103 sets blank as an attribute value for the attribute (step S2518). The view processing unit 103 sends the attribute value to the request receiving unit 202 (step S2519).

The request receiving unit 202 receives the attribute value (step S2520). The request receiving unit 202 stores the acquired attribute value in the temporary information storing unit 110 (step S2521). The request receiving unit 202 judges whether the processing for all the views has been finished (step S2522). When it is judged that the processing for all the views has not been finished ("No" at step S2522), the request receiving unit 202 returns to step S2507 and executes the processing for the remaining views.

When it is judged that the processing for all the views has been finished ("Yes" at step S2522), the request receiving unit 202 edits the acquired attribute value in association with the attribute acquired from the view-acquisition-information storing unit 130 (step S2523). The request receiving unit 202 sends the edited attribute value to the UI processing unit 101 (step S2524). The UI processing unit 101 outputs the edited attribute value to a display screen and the like. Alternatively, the UI processing unit 101 transmits the edited attribute value to other information processing apparatuses connected to the information processing apparatus 500 via a network.

In this way, it is possible to set access limitation for each attribute. Therefore, it is possible to realize fine access control for not displaying a view when a general user accesses the view, because, for example, an attribute value is not set in only an attribute "password".

It is possible to not only set access control information for a view but also set access control information for an attribute of information stored by the information storing unit 140. Therefore, even when a plurality of views are switched or a view that performs new processing is added later, it is possible to realize access control intended by a user without oversights and omissions.

In access to the information storing unit 140, access control is realized without omissions in the view processing unit by accessing the information storing unit 140 through a view. Therefore, it is possible to realize access control intended by the user and firmly protect assets of the user.

The processing explained referring to FIGS. 25A and 25B is the processing for acquiring information from the information storing unit 140. However, it is possible to realize access control for each attribute in information setting processing by replacing information acquisition with information setting.

In the attribute-access-authority-information storing unit 560, the attribute and the access authority information may be stored in association each other without distinction for each type of operation. In this case, access control may be performed referring to the access authority information corresponding to the attribute in both acquisition and setting of information.

Figure 27:
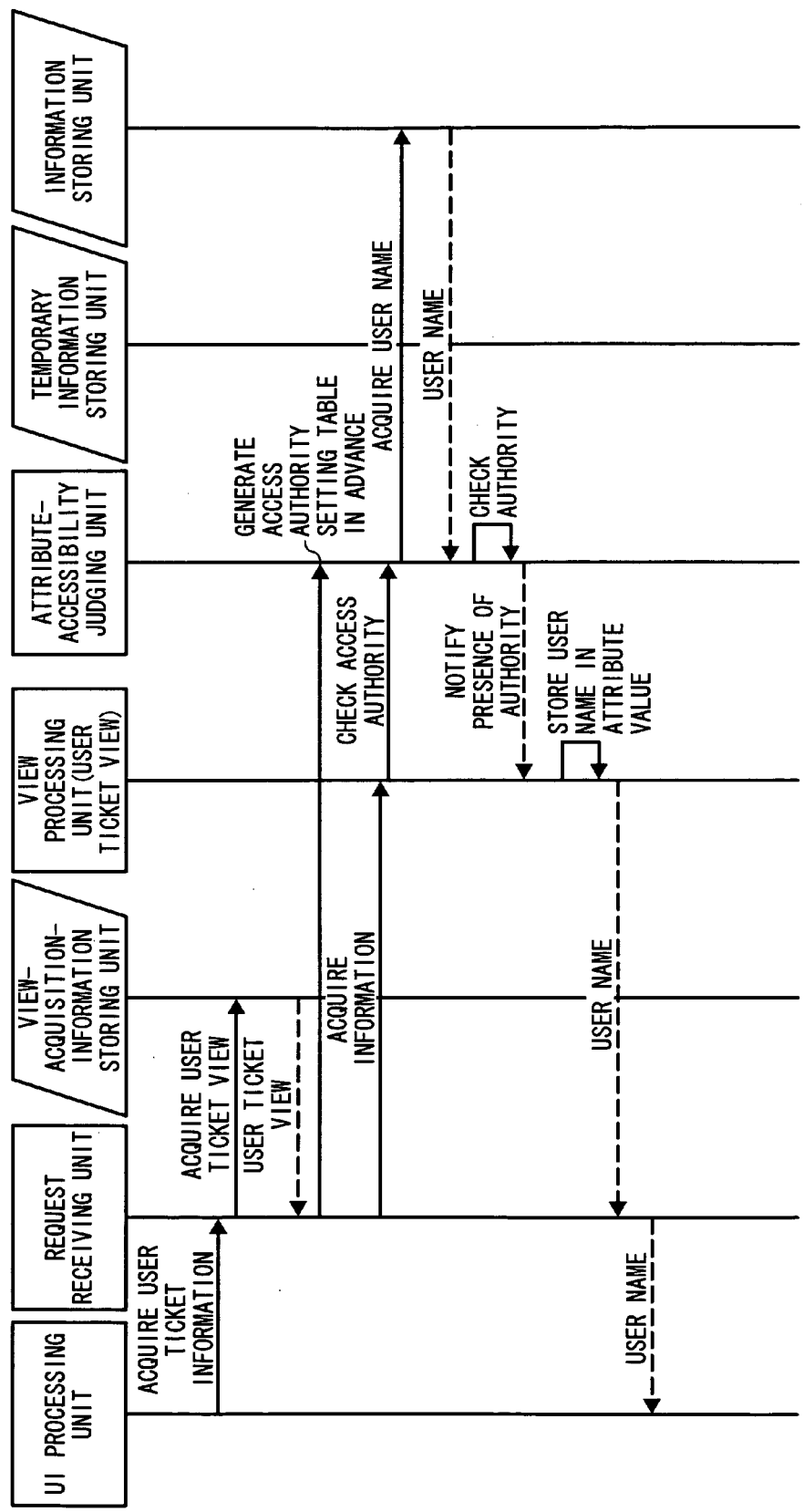
FIG. 27 is a diagram for explaining a flow of processing for acquiring user ticket information (access authority is present)
Figure 28:
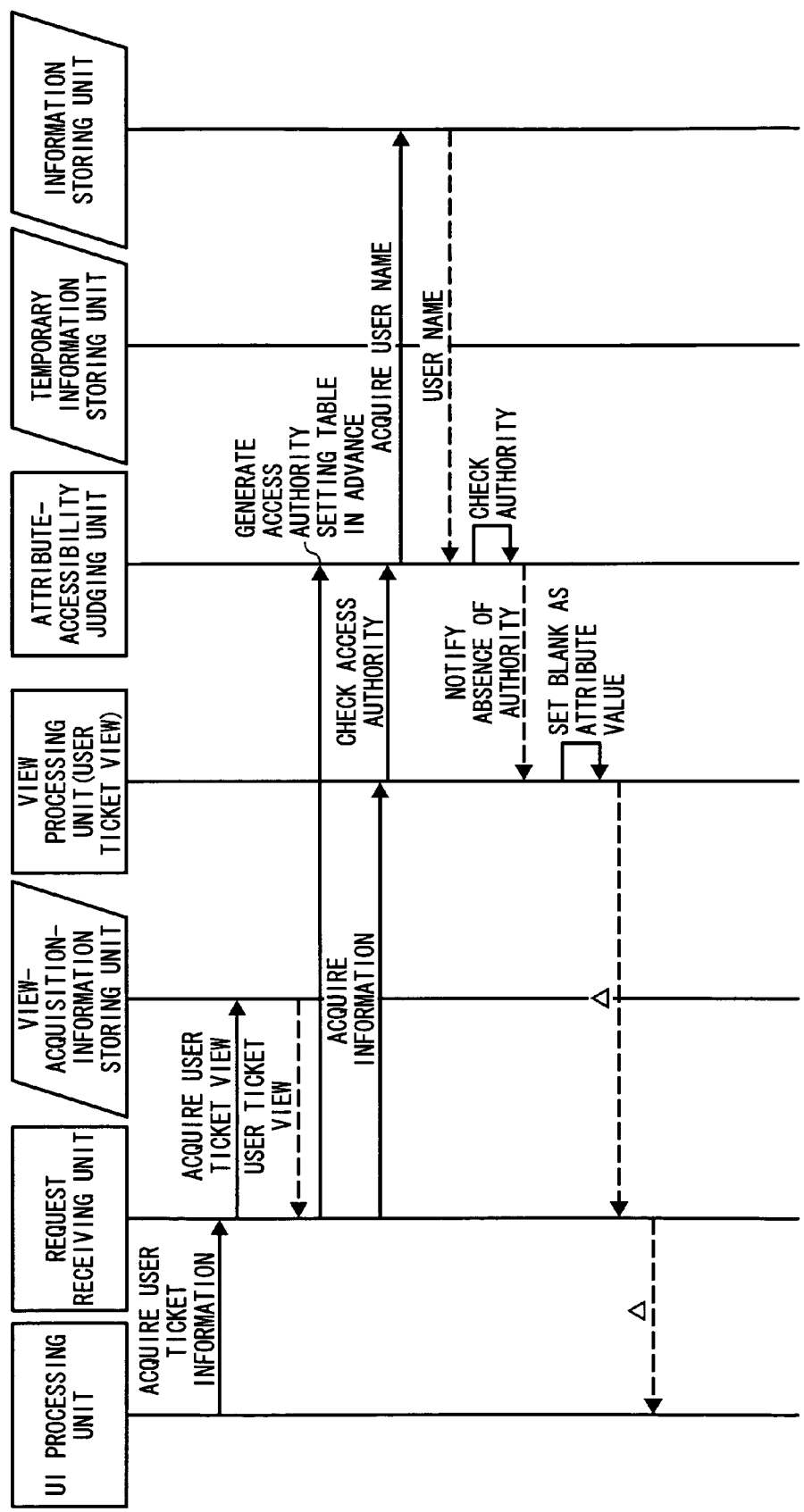
FIG. 28 is a diagram for explaining a flow of processing for acquiring user ticket information (access authority is absent)

FIG. 27 is a diagram for explaining a flow of processing for acquiring user ticket information (access authority is present) according to the flow of the flowcharts shown in FIGS. 25A and 25B. FIG. 28 is a diagram for explaining a flow of processing for acquiring user ticket information (access authority is absent) according to the flow of the flowcharts shown in FIGS. 25A and 25B. In FIGS. 27 and 28, a flow of information is mainly explained.

In FIG. 27, the request receiving unit 202 receives a request for "user ticket information" inputted by the UI processing unit 101 (step S2501). The user ticket information is user information operated in the present session. The request receiving unit 202 acquires a view name "user ticket view" corresponding to the requested "user ticket information" from the corresponding-view storing unit 120 (step S2502). The request receiving unit 202 further acquires an attribute and identification information corresponding to the acquired view name from the view-acquisition-information storing unit 130 (step S2503). The request receiving unit 202 sends the attribute and the identification information to the attribute-accessibility judging unit 504 (step S2504).

The attribute-accessibility judging unit 504 receives the attribute and the identification information (step S2505) and generates an access control setting table (step S2506).

The request receiving unit 202 reads a view "user ticket view" corresponding to the view name from the view storing unit 150 to the view processing unit 103 (step S2507). The request receiving unit 202 requests the view processing unit 103, i.e., the "user ticket view", to acquire information (step S2508).

The view processing unit (user ticket view) 103 receives the request for information acquisition from the request receiving unit 202 (step S2509). The view processing unit 103 sends a request for access authority check to the attribute-accessibility judging unit 504 (step S2510).

The attribute-accessibility judging unit 504 receives the request for access authority check (step S2511). The attribute-accessibility judging unit 504 acquires information corresponding to an attribute "user name" from the information storing unit 140 (step S2512). The attribute-accessibility judging unit 504 checks access authority of the attribute "user name" referring to the access limitation setting table (step S2513) and sends the acquired information and an access authority check result to the view processing unit 103 (step S2514).

The view processing unit 103 receives the acquired information and the access authority check result (step S2515). The view processing unit 103 judges that there is access authority of the attribute "user name" from the access authority check result ("Yes" at step S2516) and stores the acquired information as an attribute value (step S2517). The view processing unit 103 sends the attribute value to the request receiving unit 202 (step S2519).

The request receiving unit 202 receives the attribute value (step S2520) and stores the acquired attribute value in the temporary information storing unit 110 (step S2521). When it is judged that the processing for all the views has been finished ("Yes" at step S2522), the request receiving unit 202 edits the acquired attribute value in association with the attribute "user name" acquired from the view-acquisition-information storing unit 130 (step S2523). The request receiving unit 202 sends the edited attribute value to the UI processing unit 101 (step S2524). The UI processing unit 101 outputs the edited attribute value to the display screen and the like. Alternatively, the UI processing unit 101 transmits the edited attribute value to the other information processing apparatuses connected to the information processing apparatus 500 via the network.

Since FIG. 28 is substantially the same as FIG. 27, only differences are explained. Since the processing corresponding to steps S2501 to S2512 is the same as that explained referring to FIG. 27, the explanations of the steps apply. Here, explanations of the steps are omitted.

At step S2513, the attribute-accessibility judging unit 504 checks access authority of the attribute "user name" referring to the access limitation setting table (step S2513) and sends the acquired information and an access authority check result to the view processing unit 103 (step S2514). The attribute-accessibility judging unit 504 sends "access authority is absent" as the access authority check result.

The view processing unit 103 receives the acquired information and the access authority check result (step S2515). The view processing unit 103 judges that there is no access authority of the attribute "user name" from the access authority check result ("No" at step S2516) and sets blank as an attribute value (step S2158). The view processing unit 103 sends the attribute value to the request receiving unit 202 (step S2519).

The request receiving unit 202 receives the attribute value (step S2520) and stores the acquired attribute value in the temporary information storing unit 110 (step S2521). When it is judged that the processing for all the views has been finished ("Yes" at step S2522), the request receiving unit 202 edits the acquired attribute value in association with the attribute "user name" acquired from the view-acquisition-information storing unit 130 (step S2523). The request receiving unit 202 sends the edited attribute value to the UI processing unit 101 (step S2524). The UI processing unit 101 outputs the edited attribute value to the display screen and the like. Alternatively, the UI processing unit 101 transmits the edited attribute value to the other information processing apparatuses connected to the information processing apparatus 500 via the network. In this case, since a value of the attribute "user name" is blank, a user name is not displayed.

Figure 29:
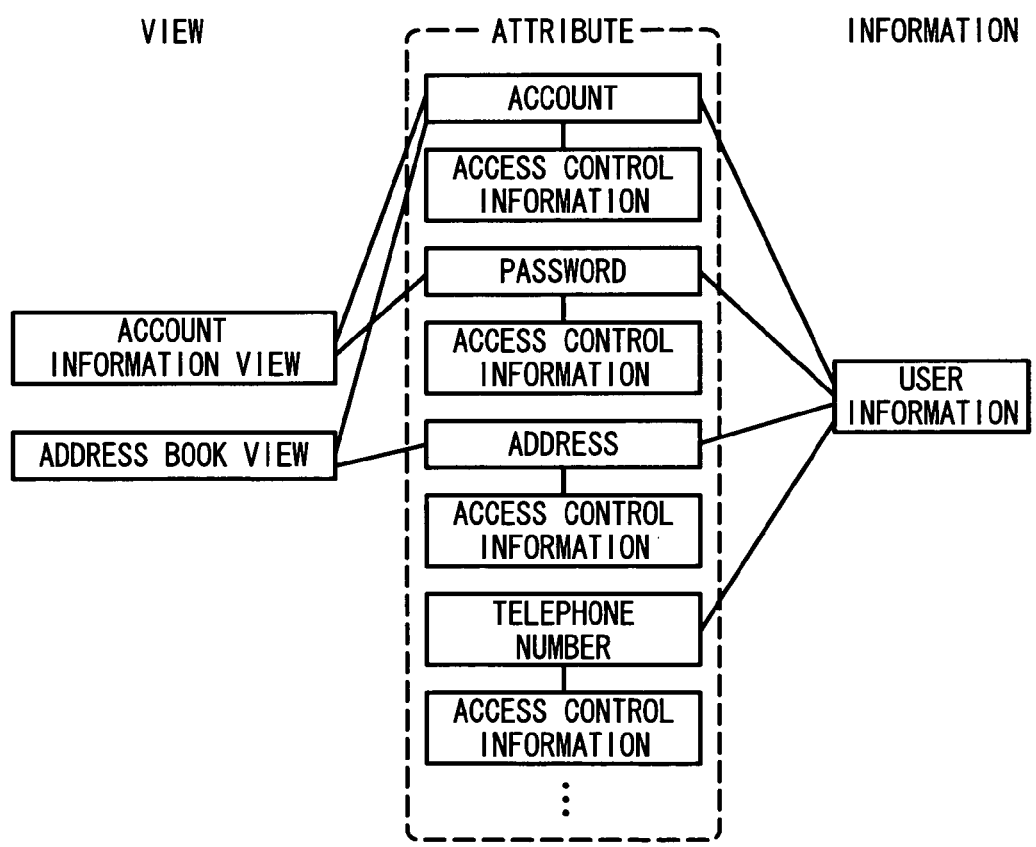
FIG. 29 is a diagram for explaining an example of a relation among views, attributes, and access control information.

FIG. 29 is a diagram for explaining an example of a relation among a view, access control information, and user information. As shown in FIG. 29, respective views access actual information via attributes. In that case, access control information (access control list: ACL) is set for each attribute. In accessing information corresponding to the attribute, access is controlled according to the access control information for each attribute. Therefore, it is possible to easily execute access control intended by the user without oversights.

The present invention has been explained referring to the first to fourth embodiments. However, various modifications and alterations of the embodiments are possible. It is possible to freely combine the structures and the functions explained in the first to fourth embodiments.

As describe described above, according to one aspect of the present invention, an apparatus for processing information includes an information storing unit that stores therein a plurality of pieces of information without redundancy in either one of the information processing apparatus and a system including the information processing apparatus; a corresponding-program storing unit that stores therein requested information indicating an attribute of a part of or all of pieces of information included in the information stored in the information storing unit and processing-program identification information for identifying a processing program for acquiring the information corresponding to the requested information from the information storing unit, in association with each other; a processing-program storing unit that stores therein the processing program corresponding to the processing-program identification information; a request receiving unit that receives the requested information input by a user; a corresponding-program acquiring unit that acquires the processing-program identification information corresponding to the requested information received by the request receiving unit from the corresponding-program storing unit; and a processing-program reading unit that reads the processing program corresponding to the processing-program identification information acquired by the corresponding-program acquiring unit from the processing-program storing unit. The request receiving unit acquires information corresponding to the requested information from the information storing unit by executing the processing program read by the processing-program reading unit. Therefore, because information requested by the user can be acquired from a group of pieces of information managed without redundancy by executing the processing program corresponding to the information, it is possible to unitarily manage identical information and the user can easily acquire information.

Furthermore, according to another aspect of the present invention, the corresponding-program acquiring unit further acquires a plurality of pieces of the processing-program identification information corresponding to the requested information received by the request receiving unit from the corresponding-program storing unit. The processing-program reading unit reads a plurality of processing programs corresponding to the pieces of processing-program identification information acquired by the corresponding-program acquiring unit from the processing-program storing unit. The request receiving unit acquires the information corresponding to the requested information from the information storing unit by sequentially executing the processing programs read by the processing-program reading unit. Therefore, because information can be acquired by combining the processing programs, if a program for acquiring basic information is prepared, it is possible to acquire various kinds of information and reduce work time for creating and managing the processing programs.

Moreover, according to still another aspect of the present invention, the apparatus further includes an access-authority storing unit that stores therein the processing-program identification information and account information concerning an account having an access authority to the information, in association with each other; and an accessibility judging unit that acquires the account information stored in association with each of the processing programs for acquiring the information corresponding to the requested information from the access-authority storing unit, and judges whether a user account used by the user has an access authority for acquiring the information corresponding to the requested information, based on the account information. When the accessibility judging unit judges that the user account has the access authority, the request receiving unit acquires the information corresponding to the requested information from the information storing unit by executing the processing programs. Therefore, because the access control can be performed by units of acquisition of the requested information, it is unnecessary to set the access authority for each piece of information and it is possible to reduce work load for the access management. In addition, it is possible to perform access control in a collection of information intended by an administrator.

Furthermore, according to still another aspect of the present invention, the apparatus further includes an authority-level storing unit that stores therein a level of the access authority for an account, and the accessibility judging unit judges that the user account set in the authority-level storing unit has the access authority for acquiring the information corresponding to the requested information from the information storing unit when the level of the access authority for the user account is equal to or higher than a level of the access authority of an account having a lowest level of the access authority among accounts for which the access authority is set for the processing programs. Therefore, because the access authority can be collectively judged for information acquisition processing performed by using the processing programs, it is possible to perform access control intended by the administrator.

Moreover, according to still another aspect of the present invention, the apparatus further includes an authority-level storing unit that stores therein a level of the access authority for an account, and the accessibility judging unit judges that the user account set in the authority-level storing unit has the access authority for acquiring the information corresponding to the requested information from the information storing unit when the level of the access authority for the user account is equal to or higher than a level of the access authority of an account having a highest level of the access authority among accounts for which the access authority is set for the processing programs. Therefore, because the access authority can be collectively judged for information acquisition processing performed by using the processing programs, it is possible to perform access control intended by the administrator.

Furthermore, according to still another aspect of the present invention, the accessibility judging unit judges that the user account has the access authority for acquiring the information corresponding to the requested information from the information storing unit when the access authority is set for the user account for all of the processing programs. Therefore, because the access authority can be collectively judged for information acquisition processing performed by using the processing programs, it is possible to perform access control intended by the administrator.

Moreover, according to still another aspect of the present invention, the apparatus further includes an attribute-access-authority storing unit that stores therein the attribute and account information concerning an account having the access authority for the information, in association with each other; and an attribute-accessibility judging unit that acquires the account information stored in association with the attribute indicated by the requested information from the attribute-access-authority storing unit, and judges whether a user account used by the user has the access authority for acquiring the information corresponding to the requested information, based on the account information. When the attribute-accessibility judging unit judges that the user account has the access authority, the request receiving unit acquires the information corresponding to the requested information from the information storing unit by executing the processing program. Therefore, the access control can be performed for each of the attributes, it is possible to perform access control without oversights and omissions.

Furthermore, according to still another aspect of the present invention, the attribute-access-authority storing unit further stores therein an operation for the information in association with the attribute and the account information, and the attribute-accessibility judging unit acquires the account information stored in association with the attribute indicated by the requested information and the operation from the attribute-access-authority storing unit, and judges whether the user account used by the user has the access authority for acquiring the information corresponding to the requested information, based on the account information. Therefore, because the access control can be performed for each kind of operation (e.g., acquisition and setting of information) for the attributes, it is possible to perform access control corresponding to the attributes and the operation.

Moreover, according to still another aspect of the present invention, the processing program further performs a routine processing set in advance. Therefore, because the routine processing can be performed together with the information acquisition, it is possible to realize efficiency of work.

Furthermore, according to still another aspect of the present invention, a method of acquiring information is for an image processing apparatus that includes an information storing unit that stores therein a plurality of pieces of information without redundancy in either one of the information processing apparatus and a system including the information processing apparatus, a corresponding-program storing unit that stores therein requested information indicating an attributes of a part of or all of pieces of information included in the information stored in the information storing unit and processing-program identification information for identifying a processing program for acquiring the information corresponding to the requested information from the information storing unit, in association with each other, and a processing-program storing unit that stores therein the processing program corresponding to the processing-program identification information. The method includes request receiving includes receiving the requested information input by a user; corresponding-program acquiring includes acquiring the processing-program identification information corresponding to the requested information received at the request receiving from the corresponding-program storing unit; and processing-program reading includes reading the processing program corresponding to the processing-program identification information acquired at the corresponding-program acquiring from the processing-program storing unit. The request receiving includes acquiring information corresponding to the requested information from the information storing unit by executing the processing program read at the processing-program reading. Therefore, because information requested by the user can be acquired from a group of pieces of information managed without redundancy by executing the processing program corresponding to the information, it is possible to unitarily manage identical information and the user can easily acquire information.

Moreover, according to still another aspect of the present invention, the corresponding-program acquiring includes acquiring a plurality of pieces of the processing-program identification information corresponding to the requested information received at the request receiving from the corresponding-program storing unit. The processing-program reading includes reading a plurality of processing programs corresponding to the pieces of processing-program identification information acquired at the corresponding-program acquiring from the processing-program storing unit. The request receiving includes acquiring the information corresponding to the requested information from the information storing unit by sequentially executing the processing programs read at the processing-program reading. Therefore, because information can be acquired by combining the processing programs, if a program for acquiring basic information is prepared, it is possible to acquire various kinds of information and reduce work time for creating and managing the processing programs.

Furthermore, according to still another aspect of the present invention, the method further includes accessibility judging including acquiring the account information stored in association with each of the processing programs for acquiring the information corresponding to the requested information from an access-authority storing unit that stores therein the processing-program identification information and account information concerning an account having an access authority to the information, in association with each other, and judging whether a user account used by the user has an access authority for acquiring the information corresponding to the requested information, based on the account information. When it is judged that the user account has the access authority, the request receiving includes acquiring the information corresponding to the requested information from the information storing unit by executing the processing programs. Therefore, because the access control can be performed by units of acquisition of the requested information, it is unnecessary to set the access authority for each piece of information and it is possible to reduce work load for the access management. In addition, it is possible to perform access control in a collection of information intended by an administrator.

Moreover, according to still another aspect of the present invention, the accessibility judging includes judging that the user account set in an authority-level storing unit that stores therein a level of the access authority for an account has the access authority for acquiring the information corresponding to the requested information from the information storing unit when the level of the access authority for the user account is equal to or higher than a level of the access authority of an account having a lowest level of the access authority among accounts for which the access authority is set for the processing programs. Therefore, because the access authority can be collectively judged for information acquisition processing performed by using the processing programs, it is possible to perform access control intended by the administrator.

Furthermore, according to still another aspect of the present invention, the accessibility judging includes judging that the user account set in an authority-level storing unit that stores therein a level of the access authority for an account has the access authority for acquiring the information corresponding to the requested information from the information storing unit when the level of the access authority for the user account is equal to or higher than a level of the access authority of an account having a highest level of the access authority among accounts for which the access authority is set for the processing programs. Therefore, because the access authority can be collectively judged for information acquisition processing performed by using the processing programs, it is possible to perform access control intended by the administrator.

Moreover, according to still another aspect of the present invention, the accessibility judging includes judging that the user account has the access authority for acquiring the information corresponding to the requested information from the information storing unit when the access authority is set for the user account for all of the processing programs. Therefore, because the access authority can be collectively judged for information acquisition processing performed by using the processing programs, it is possible to perform access control intended by the administrator.

Furthermore, according to still another aspect of the present invention, the method further includes attribute-accessibility judging including acquiring the account information stored in association with the attribute indicated by the requested information from an attribute-access-authority storing unit that stores therein the attribute and account information concerning an account having the access authority for the information, in association with each other, and judging whether a user account used by the user has the access authority for acquiring the information corresponding to the requested information, based on the account information. When it is judged that the user account has the access authority, the request receiving includes acquiring the information corresponding to the requested information from the information storing unit by executing the processing program. Therefore, the access control can be performed for each of the attributes, it is possible to perform access control without oversights and omissions.

Moreover, according to still another aspect of the present invention, the attribute-access-authority storing unit further stores therein an operation for the information in association with the attribute and the account information. The attribute-accessibility judging includes acquiring the account information stored in association with the attribute indicated by the requested information and the operation from the attribute-access-authority storing unit, and judging whether the user account used by the user has the access authority for acquiring the information corresponding to the requested information, based on the account information. Therefore, because the access control can be performed for each kind of operation (e.g., acquisition and setting of information) for the attributes, it is possible to perform access control corresponding to the attributes and the operation.

Furthermore, according to still another aspect of the present invention, the processing program further performs a routine processing set in advance. Therefore, because the routine processing can be performed together with the information acquisition, it is possible to realize efficiency of work.

Moreover, according to still another aspect of the present invention, the effects described above can be realized by causing a computer to execute the information acquiring method described above.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An apparatus comprising a processor coupled to a memory for processing information, the apparatus further comprising:
   an information storing unit that stores therein a plurality of pieces of information without redundancy in either one of the information processing apparatus and a system including the information processing apparatus;
   a corresponding-program storing unit that stores therein requested information indicating at least first and second attributes of a part of or all of pieces of information included in the information stored in the information storing unit, first processing-program identification information for identifying a first processing program for acquiring, from the information storing unit, information corresponding to the first attribute indicated by the requested information, and second processing-program identification information for identifying a second processing program for acquiring information corresponding to the second attribute indicated by the requested information, the requested information being stored in the corresponding-program storing unit in association with the first and second processing-program identification information, and wherein the first attribute is different than the second attribute, the first processing-program identification information is different than the second processing-program identification information, and the first processing program is different than the second processing program;
   a processing-program storing unit that stores therein together the first and second processing programs corresponding to the first and second processing-program identification information;
   a request receiving unit that receives the requested information input by a user;
   a corresponding-program acquiring unit that acquires the first and second processing-program identification information corresponding to the requested information received by the request receiving unit from the corresponding-program storing unit; and
   a processing-program reading unit that reads the first and second processing programs corresponding to the first and second processing-program identification information acquired by the corresponding-program acquiring unit from the processing-program storing unit,
   wherein the request receiving unit acquires information corresponding to the requested information by acquiring information having the first attribute from the information storing unit by executing the first processing program read by the processing-program reading unit, then storing the acquired information having the first attribute in a temporary storing unit, and then acquiring information having the second attribute from the information having the first attribute stored in the temporary storing unit by executing the second processing program read by the processing-program reading unit; and
   wherein said apparatus further comprises: an access-authority storing unit that stores therein processing-program identification information and account information concerning an account having an access authority to the information, in association with each other; and
   an accessibility judging unit that acquires the account information stored in association with each of the processing programs for acquiring the information corresponding to the requested information from the access-authority storing unit, and then judges whether a user account used by the user has an access authority for acquiring the information corresponding to the requested information, based on the account information,
   wherein after the accessibility judging unit judges that the user account has the access authority, the request receiving unit acquires the information corresponding to the requested information from the information storing unit by executing the processing programs, such that the accessibility judging unit judges that the user account has the access authority before the first and second processing programs are executed; and
   wherein said apparatus further comprises: an attribute-access-authority storing unit that stores therein the attribute and account information concerning an account having the access authority for the information, in association with each other; and an attribute-accessibility judging unit that acquires the account information stored in association with the attribute from the attribute-access-authority storing unit, and judges whether a user account used by the user has the access authority for acquiring the information corresponding to the requested information, based on the account information, wherein when the attribute-accessibility judging unit judges that the user account has the access authority, the request receiving unit acquires the information corresponding to the requested information.

2. The apparatus according to claim 1, wherein the processing-program reading unit reads the second processing program before the request receiving unit executes the first processing program.

3. The apparatus according to claim 2, further comprising an authority-level storing unit that stores therein a level of the access authority for an account, wherein the accessibility judging unit judges that the user account set in the authority-level storing unit has the access authority for acquiring the information corresponding to the requested information when the level of the access authority for the user account is equal to or higher than a level of the access authority of an account having a lowest level of the access authority among accounts for which the access authority is set for the processing programs.

4. The apparatus according to claim 2, further comprising an authority-level storing unit that stores therein a level of the access authority for an account, wherein the accessibility judging unit judges that the user account set in the authority-level storing unit has the access authority for acquiring information corresponding to the requested information when the level of the access authority for the user account is equal to or higher than a level of the access authority of an account having a highest level of the access authority among accounts for which the access authority is set for the processing programs.

5. The apparatus according to claim 2, wherein the accessibility judging unit judges that the user account has the access authority when the access authority is set for the user account for all of the processing programs.

6. The apparatus according to claim 1, wherein the attribute-access-authority storing unit further stores therein an operation for the information in association with an attribute and the account information, and the attribute-accessibility judging unit acquires the account information stored in association with an attribute indicated by the requested information and the operation from the attribute-access-authority storing unit, and judges whether the user account used by the user has the access authority for acquiring the information corresponding to the requested information, based on the account information.

7. The apparatus according to claim 1, wherein the first and second processing programs each perform routine processing set in advance.

8. A method of acquiring information, the method comprising:
- providing an image processing apparatus that includes an information storing unit that stores therein a plurality of pieces of information without redundancy in either one of the image processing apparatus and a system including the image processing apparatus, a corresponding-program storing unit that stores therein requested information indicating at least first and second attributes of a part of or all of pieces of information included in the information stored in the information storing unit, first processing-program identification information for identifying a first processing program for acquiring, from the information storing unit, information corresponding to the first attribute indicated by the requested information, and second processing-program identification information for identifying a second processing program for acquiring information corresponding to the second attribute indicated by the requested information, the requested information being stored in the corresponding-program storing unit in association with the first and second processing-program identification information, and wherein the first attribute is different than the second attribute, the first processing-program identification information is different than the second processing-program identification information, and the first processing program is different than the second processing program, and a processing-program storing unit that stores therein together the first and second processing programs corresponding to the first and second processing-program identification information;
- receiving the requested information input by a user;
- acquiring, from the corresponding-program storing unit, the first and second processing-program identification information corresponding to the requested information input by the user;
- reading the first and second processing programs corresponding to the acquired processing-program identification information;
- executing the first processing program, and thereby acquiring, from the information storing unit, information corresponding to the first attribute indicated by the requested information input by the user;
- subsequently storing, in a temporary storing unit, the information corresponding to the first attribute indicated by the requested information input by the user; and
- subsequently executing the second processing program, and thereby acquiring, from the temporary storing unit, information corresponding to the second attribute indicated by the requested information input by the user, the temporary storing unit being different than the information storing unit; and
- wherein the method further comprises acquiring account information stored in association with each of the processing programs for acquiring the information corresponding to the requested information from an access-authority storing unit that stores therein the processing-program identification information and account information concerning an account having an access authority to the information, in association with each other, and
- judging whether a user account used by the user has an access authority for acquiring the information corresponding to the requested information, based on the account information, wherein when it is judged that the user account has the access authority, acquiring the information corresponding to the requested information from the information storing unit by executing the processing programs; and
- wherein the accessibility judging includes judging that the user account set in an authority-level storing unit that stores therein a level of the access authority for an account has the access authority for acquiring the information corresponding to the requested information from the information storing unit when the level of the access authority for the user account is equal to or higher than a level of the access authority of an account having a lowest level of the access authority among accounts for which the access authority is set for the processing programs; and
- wherein the method further comprises acquiring account information stored in association with an attribute indicated by the requested information from an attribute-access-authority storing unit that stores therein an attribute and account information concerning an account having the access authority for the information, in association with each other, and
- judging whether a user account used by the user has the access authority for acquiring the information corresponding to the requested information, based on the account information,
- wherein when it is judged that the user account has the access authority, acquiring the information corresponding to the requested information from the information storing unit by executing the processing program.

9. The method according to claim 8, wherein the step of reading the second processing program occurs before the step of executing the first processing program.

10. The method according to claim 9, wherein the accessibility judging includes judging that the user account has the access authority for acquiring the information corresponding to the requested information when the access authority is set for the user account for all of the processing programs.

11. The method according to claim 8, wherein the attribute-access-authority storing unit further stores therein an operation for the information in association with an attribute and the account information, and
- the attribute-accessibility judging includes
- acquiring the account information stored in association with an attribute indicated by the requested information and the operation from the attribute-access-authority storing unit, and
- judging whether the user account used by the user has the access authority for acquiring the information corresponding to the requested information, based on the account information.

12. The method according to claim 8, wherein the first and second processing programs each perform routine processing set in advance.

13. A method of acquiring information, the method comprising:
provide an image processing apparatus that includes:
an information storing unit that stores therein a plurality of pieces of information without redundancy in either one of the image processing apparatus and a system including the processing apparatus,
a corresponding-program storing unit that stores therein requested information indicating at least first and second attributes of a part of or all of pieces of information included in the information stored in the information storing unit, first processing-program identification information for identifying a first processing program for acquiring, from the information storing unit, information corresponding to the first attribute indicated by the requested information, and second processing-program identification information for identifying a second processing program for acquiring information corresponding to the second attribute indicated by the requested information, the requested information being stored in the corresponding-program storing unit in association with the first and second processing-program identification information, and wherein the first attribute is different than the second attribute, the first processing-program identification information is different than the second processing-program identification information, and the first processing program is different than the second processing program, and
a processing-program storing unit that stores therein together the first and second processing programs corresponding to the first and second processing-program identification information;
receiving the requested information input by a user;
acquiring, from the corresponding-program storing unit, the first and second processing-program identification information corresponding to the requested information input by the user;
reading the first and second processing programs corresponding to the acquired processing-program identification information;
executing the first processing program, and thereby acquiring, from the information storing unit, information corresponding to the first attribute indicated by the requested information input by the user;
subsequently storing, in a temporary storing unit, the information corresponding to the first attribute indicated by the requested information input by the user;
subsequently executing the second processing program, and thereby acquiring, from the information having the first attribute stored in the temporary storing unit, information corresponding to the second attribute indicated by the requested information input by the user, the temporary storing unit being different than the information storing unit; and
wherein the method further comprises acquiring account information stored in association with each of the processing programs for acquiring the information corresponding to the requested information from an access-authority storing unit that stores therein the processing-program identification information and account information concerning an account having an access authority to the information, in association with each other, and
judging whether a user account used by the user has an access authority for acquiring the information corresponding to the requested information, based on the account information, wherein when it is judged that the user account has the access authority, acquiring the information corresponding to the requested information from the information storing unit by executing the processing programs; and
wherein the accessibility judging includes judging that the user account set in an authority-level storing unit that stores therein a level of the access authority for an account has the access authority for acquiring the information corresponding to the requested information from the information storing unit when the level of the access authority for the user account is equal to or higher than a level of the access authority of an account having a lowest level of the access authority among accounts for which the access authority is set for the processing programs; and
wherein the method further comprises acquiring account information stored in association with an attribute indicated by the requested information from an attribute-access-authority storing unit that stores therein an attribute and account information concerning an account having the access authority for the information, in association with each other, and
judging whether a user account used by the user has the access authority for acquiring the information corresponding to the requested information, based on the account information,
wherein when it is judged that the user account has the access authority, acquiring the information corresponding to the requested information from the information storing unit by executing the processing program.

* * * * *